United States Patent

[11] 3,562,431

[72] Inventors Hiroshi Inose;
Toshiharu Aoki, Tokyo, Japan
[21] Appl. No 750,511
[22] Filed Aug. 6, 1968
[45] Patented Feb. 9, 1971
[73] Assignee Hitachi, Ltd. and Hiroshi Inose
Tokyo, Japan
[32] Priority Aug. 7, 1967
[33] Japan
[31] 42/50314

[54] ASYNCHRONOUS COMMUNICATIONS SYSTEM
10 Claims, 31 Drawing Figs.

[52] U.S. Cl. 179/15, 325/38
[51] Int. Cl. H04j 3/12
[50] Field of Search 325/38A, 38.B 179/15A, 41A

[56] References Cited
UNITED STATES PATENTS
3,292,178 12/1966 Magnuski 179/15X(Async)

*Primary Examiner*—Ralph D. Blakeslee
*Attorney*—Craig and Antonelli

ABSTRACT: An asynchronous communication system for mobile and fixed radio communications which includes a plurality of subscriber's stations, a plurality of trunk stations and a central station, in which the subscriber's speech and associated audible signals are first modulated into three-level delta modulation pulses, then coded into a frequency-time address assigned to those subscribers, transmitted by radio, received by one of the nearby trunk stations, address decoded first to identify the subscriber, then demodulated to voice band signals, transmitted to the central office having stored program control features, switched in accordance with the dialed information to establish connection to the other subscriber's stations, transmitted to another of the trunk stations nearby the other subscriber's stations, first modulated into three-level delta modulation, then coded into address codes assigned to the other subscriber's stations, transmitted by radio, received by the other subscriber's stations by means of address codes, then demodulated into speech and sent to other subscribers.

INVENTORS
HIROSHI INOSE
TOSHIHARU AOKI
BY Craig & Antonelli
ATTORNEYS

INVENTORS
HIROSHI INOSE
TOSHIHARU AOKI

BY Craig & Antonelli
ATTORNEYS

INVENTORS
HIROSHI INOSE
TOSHIHARU AOKI
BY Craig & Antonelli
ATTORNEYS

INVENTORS
HIROSHI INOSE
TOSHIHARU AOKI
BY Craig & Antonelli
ATTORNEYS

INVENTORS
HIROSHI INOSE
TOSHIHARU AOKI
BY Craig & Antonelli
ATTORNEYS

INVENTORS
HIROSHI INOSE
TOSHIHARU AOKI
BY Craig & Antonelli
ATTORNEYS

INVENTORS
HIROSHI INOSE
TOSHIHARU AOKI
BY Craig & Antonelli
ATTORNEYS

INVENTORS
HIROSHI INOSE
TOSHIHARU AOKI
BY
Craig & Antonelli
ATTORNEYS

INVENTORS
HIROSHI INOSE
TOSHIHARU AOKI
BY
Craig & Antonelli
ATTORNEYS

INVENTORS
HIROSHI INOSE
TOSHIHARU AOKI
BY
Craig & Antonelli
ATTORNEYS

INVENTORS
HIROSHI INOSE
TOSHIHARU AOKI
BY Craig & Antonelli
ATTORNEYS

INVENTORS
HIROSHI INOSE
TOSHIHARU AOKI
BY Craig & Antonelli
ATTORNEYS

INVENTORS
HIROSHI INOSE
TOSHIHARU AOKI
BY Craig & Antonelli
ATTORNEYS

INVENTORS
HIROSHI INOSE
TOSHIHARU AOKI
BY Craig & Antonelli
ATTORNEYS

INVENTORS
HIROSHI INOSE
TOSHIHARU AOKI
BY Craig & Antonelli
ATTORNEYS

INVENTORS
HIROSHI INOSE
TOSHIHARU AOKI

BY Craig & Antonelli
ATTORNEYS

ASYNCHRONOUS COMMUNICATIONS SYSTEM

BACKGROUND OF THE INVENTION

This invention relates to an asynchronous communications system.

In an ultimate form of communications system, it is required that person-to-person communication be able to be carried on any time and anywhere. From such standpoint, it is desirable that the communication circuits be constructed in such a manner that the subscribers may be mobile, thus avoiding limitations with respect to subscriber location. No other suitable method than utilization of mobile circuits can be found to meet such a desire. In an attempt to approach such an ideal ultimate form of communications system, various problems are encountered such as the size, weight and cost of the subscriber device, frequency spectrum limitations which restrict the number of subscribers to be accommodated and so forth. For this reason, the mobile radio system has presently been utilized in special purposes or only in limited forms.

SUMMARY OF THE INVENTION

Accordingly, it is a primary object of the present invention to provide a novel and improved communications system which is capable of solving the foregoing problems. In the present system, an asynchronous multiplex communications system is adopted to achieve effective utilization of the frequency band to thereby make it possible to accommodate a great number of subscribers. A central station is provided to prevent limitless deterioration in the S/N ratio of the circuits which tends to occur when simultaneous speech occurs between the respective subscriber stations. As the speech control is effected by the use of an exchange system, a variety of services to the subscribers are provided that cannot be performed by the prototype system in which the connection is performed directly between the subscriber stations and at the some time the functions required to the subscriber stations are greatly reduced so that the size, weight and cost of the devices can be decreased.

Other objects, features and advantages of the present invention will become apparent from the following description taken in conjunction with the accompanying drawings:

DESCRIPTION OF THE PREFERRED EMBODIMENTS

Figure 1:
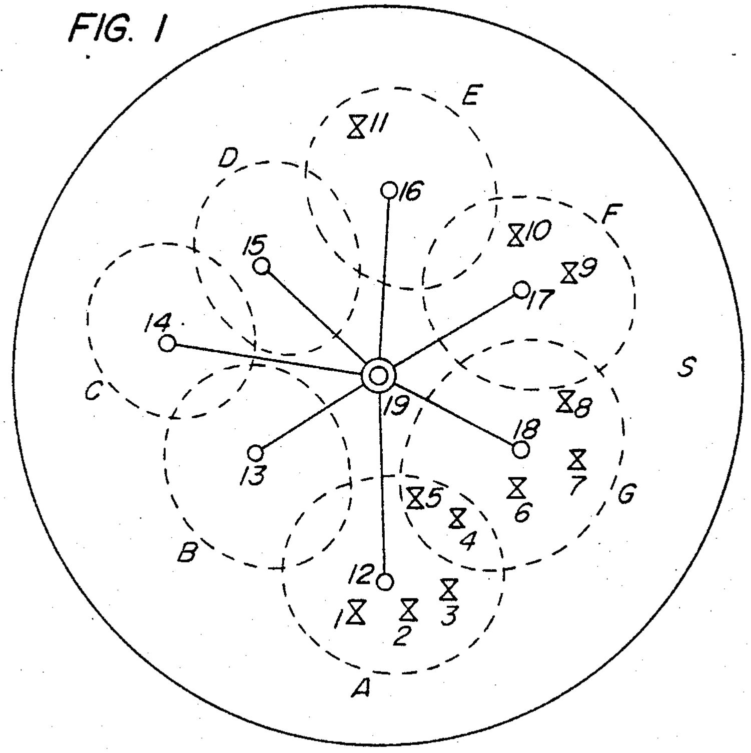
FIG. 1 is a view useful for explaining the interconnection between subscriber stations, trunk stations and central station in the asynchronous communications system according to the present invention.

Referring first to FIG. 1 of the drawings, the area where subscriber stations 1 to 11 are installed is divided into subareas A to G where there are provided trunk stations 12 to 18 respectively. The subscriber stations in the respective subareas are combined with each other through the trunk stations, and the latter are controlled by the central station 19. In case a communication area is divided into subareas as described above, the transmission power each subscriber device may be as low as that by which communication within each subarea can be achieved. Furthermore, the total number of the subscribers accommodated in each subarea is reduced so that interference between simultaneous parties can be minimized. Being a pulse communication system, this system is liable to be subject to the so-called multipath effect due to the influence of geographical features. However, it is possible to minimize such adverse effects of geographical features by dividing the communication area into subareas as mentioned above.

Thus, the communications system according to the present invention can be said to be a novel asynchronous communications system which is capable of achieving not only the various functions of the mobile radio communications system, telephone switching system, pulse radio communications system and so forth but also the functions which are newly produced by the combination of these systems.

In general, it can be said that the following are requirements for the primary modulation system in the asynchronous integrated communications system using the asynchronous multiplex communications principle.

1. In the case of asynchronous multiplex communications, the subscriber primary modulation system should be a pulse modulation system, from the standpoint of the address modulation system.
2. In the asynchronous communications system, synchronization of the time axis cannot be achieved. Especially in the case of mobile communications in the VHF or UHF band, there often occur a variety of interferences. As a result, the pulse error rate is of the order of $10^{-1}$ to $10^{0}$. Hence, difficulty is encountered in an attempt to reduce the pulse error rate by providing a synchronous means in a subscriber device.
3. The quantity of noise stemming from interference between talking subscribers increases in proportion to the *n*th power (*n*: integer) of the number of simultaneously talking subscribers. The quantity is so great that it is essential that use be made of a modulation system which is not adversely affected by pulse errors due to interference noise.
4. The smaller the number of pulses generated in the modulator, the better for the purpose of minimizing interference between the subscribers.
5. It is required that address codes be easily able to be provided.
6. It is also required that the number of simultaneous parties and that of office service subscribers be maximized.
7. The modulator and demodulator should be stable in operation, small-sized and light in weight.

Among the presently available modulation systems capable of meeting the requirement of the above item (1) are PCM, PPM, delta modulation, synchronous three-level delta modulation, asynchronous three-level delta modulation, and so forth.

PCM fails to satisfy all the above requirements except that of item (1), and synchronization is absolutely essential in modulation and demodulation. Therefore, it cannot be utilized.

In the case of PPM, such strict synchronization as is required in PCM is not required, but it is still necessary to employ synchronizing means. This constitutes a disadvantage of PPM. Furthermore, PPM fails to satisfy the requirements described in the above item (3), and it is adversely affected by a large quantity of pulse noise. Therefore, PPM is not suitable to be used as primary modulation system. In the delta modulation system, a signal is sampled at a much shorter period than the sampling period in accordance with the sampling theorem so that a unity bit output is produced. Thus, this system is very effective with respect to the problem of noise. With a system using delta modulation, however, the number of pulses generated therein is so great that it cannot meet the requirement of item (4). Therefore, in the receiver, it is necessary to effect synchronous cutoff. Obviously, this is contradictory to the condition described above in item (2).

This modulation system is far inferior to PPM especially with respect to the number of pulses generated therein. By using the synchronous three-level delta modulation system, however, it is possible to reduce the number of pulses generated down to about 8000 per second, as is the case with the asynchronous three-level delta modulation system. Furthermore, the synchronous three-level delta modulation system can well meet the conditions described above in item (3), and therefore it can be said to be superior to any of the foregoing systems. However, in the synchronous system of this type, output pulses occur at regular intervals so that address codes also occur periodically successively at the same regular intervals. Thus, false address codes tend to occur periodically, resulting in an intelligible noise. In order to prevent this, it is required that the total number of addresses or the number of office service subscribers be considerably reduced. The asynchronous communications system according to the present invention is characterized by using as the primary modulation system of the asynchronous multiplex communications system the asynchronous three-level delta modulation system which is the primary modulation system most suitable to the asynchronous communications system and which is capable of completely satisfying all the requirements described above in items (1) to (7) which could not be met by any other system.

In the asynchronous multiplex communications system which is so designed as to achieve radio communication by providing a suitable address to the output of the asynchronous three-level delta modulator, a system using an F–T matrix is suitable for the secondary modulation system for providing a specific address to each subscriber to thereby make the subscriber device as simple as possible and enabling a great number of subscribers to be accommodated within a limited frequency band to thereby increase the efficiency of using radio waves.

The asynchronous communications system according to the present invention has the following features:

1. Each subscriber is provided with its own specific address to simplify the subscriber station equipment. No variable elements are included except in special cases.
2. Different address codes are provided to the outputs +1 and −1 of the modulator, however, there is no possibility that both of these addresses exist in the space simultaneously so that there is no need to provide completely independent addresses for each subscriber. Thus, use is made of such an address providing system that the circuit arrangement is simplified.

The aforementioned asynchronous three-level delta modulation system is described in detail, for example, in such publications as ELECTRONICS AND COMMUNICATION IN JAPAN VOL 49, No. 3, March, 1966, pp. 34–43 (English edition of DENKI TSUSHIN GAKKAI ZASSHI) and "Electronics Letters" VOL. 2, No. 3, March, 1966.

Also, the asynchronous communications system according to the present invention is characterized in that the trunk and exchange system for achieving connection between the subscriber devices are equipped with the following function. That is, the respective trunk stations which serve as junctions between all the wireless communication circuits and the wire communication circuits in all of the circuits connecting any talking subscribers with another station are characterized by being equipped with such functions as to demodulate the addresses of all the subscribers, sending the resulting signals to the central station, and providing addresses to the signals from the central station so as to send the signals to the respective subscribers. The central station is characterized by being equipped with switching functions such as discrimination of called subscribers, the establishing of channels to the called subscribers and so forth, a function to monitor the S/N ratio in each trunk station for the purpose of preventing limitless decrease in the S/N ratio, a function to reswitch the channel to the nearest trunk station in case the receiving level is decreased as a result of movement of a subscriber, and other functions such as provision of priority calls for making emergency communications and information activities possible, realization of call waiting function for economical utilization of service channels for the subscribers, and so forth.

Radio communication is effected in the channels between the subscribers and the trunk stations, and wire communication in the channels between the trunk stations and the central station. Thus, it is possible to transmit address-demodulated signals either directly or with the signals demodulated to sound signals. Preferably, the signals may be transmitted in the form of speech signals, since speech demodulators are not too expensive. By doing so, the band width required to the trunks can be decreased, and the modulator and demodulator at the central station can be eliminated, thus resulting in economy of the trunks and exchange. Taking into consideration the fact that more versatility is required for the control system than that presently utilized for radio wire communications, the stored program system is adopted. Naturally, therefore, almost all of these control functions are concentrated at the central station, but the scanning functions for the subscribers are separately provided at the respective trunk stations, in view of the fact that the reception and transmission terminals of the respective subscribers are included in all the trunk stations, and that the signalling system is considerably complicated. It is also possible to disperse the various functions to the trunk stations depending upon the scale of the system. From the nature of mobile radio communications, it is considered that such dispersion of functions is appropriate in some cases.

The S/N monitoring system according to the present invention is characterized by using the following means. The probability $P_{\mu a}$ at which a false address occurs which is externally introduced to the subscribers using frequencies $f_1$, $f_2$ and $f_3$ is given by $$P_{\mu a} = N_1 \cdot N_2 \cdot N_3 \left(\frac{3M\tau_o}{N_t}\right)^3 \qquad (1)$$

where $N_1$ is the number of simultaneously talking subscribers using the frequency of $f_1$, $N_2$ the number of simultaneously talking subscribers using the frequency of $f_2$, and $N_3$ the number of simultaneously talking subscribers using the frequency of $f_3$. A distortion power $N_T$ which occurs in the demodulated waveform due to the false address is given by $$N_T = \frac{\Delta^2 (f_b - f_a)}{\pi^2 f_a f_b} \cdot \frac{1}{\tau_o} \left(1 - \frac{M}{2}\tau_o\right) P_{\mu a} \qquad (2)$$

where $f_a$ and $f_b$ represent the lower and upper frequency limits of the signal band respectively, $\tau_o$ the pulse width given for each pulse constituting the address code, and M the number of pulses generated in the modulator per second. From Equation (2), it will be seen that the distortion power $N_T$ is proportional to $P_{\mu a}$. Thus, the S/N of the demodulated signal can be kept above a predetermined value by keeping $P_{\mu a}$ or $N_1 \cdot N_2 \cdot N_3$ below a predetermined value.

In order to make $N_1 \cdot N_2 \cdot N_3$ smaller than a constant value $K^3$ when $N_1$, $N_2$ and $N_3$ are substantially equal to each other, use can be made of such a monitoring system that each $N_j$ is made smaller than K to satisfy the following relationship:

$N_1 < K$ (3a)

$N_2 < K$ (3b)

$N_3 < K$ (3c)

This is referred to as independent blocking method. Further, it is also possible to adopt such a monitoring system that the product of the three expressions (3a), (3b), (3c) becomes smaller than $K^3$ or the following relationship can be met:

$N_1N_2N_3 < K^3$ (4)

This is called mutual blocking method. It has been found that of these two blocking methods, the mutual blocking method has a lower blocking probability. (Refer to the thesis No. 1006 entitled "Asynchronous Synthetic Communications System - Part 2" reported at the 1966 National Convention of the Institute of Electrical and Communication Engineers of Japan.) The efficiency of using the frequency slot can be enhanced more in the cases where the S/N is more quantitatively monitored as in the mutual blocking method. In the independent blocking method, on the other hand, an unnecessarily large number of trunks are blocked so that the efficiency of using the frequency slot is correspondingly decreased. However, these blocking methods can be selected according to the intended purpose. Furthermore, the following various systems are conceivable instead of the mutual blocking method using the monitoring system. Namely, $N_1 + N_2 + N_3 < 3K$ (5)

$aN_1 + bN_2 + cN_3 < (a+b+c)K$ (6)

$$\sqrt{N_1^2+N_2^2+N_3^2} < \sqrt{3K} \quad (7)$$

Even if the relationship (4) (5), (6) or (7) holds true, all of the relationships (3) are not always satisfied. Thus, it can be considered that the monitoring system satisfying the relationship (5) wherein the sum of $N_1$, $N_2$ and $N_3$ becomes smaller than a constant threshold value of 3K, the monitoring system meeting the relationship (6) wherein a weighted sum of $N_1$, $N_2$ and $N_3$ becomes smaller than a constant threshold value of $(a+b+c)K$ (a, b and c are constants each representing a weight), and the monitoring system satisfying the relationship (7) wherein the mean square root of $N_1$, $N_2$ and $N_3$ becomes smaller than a constant threshold value $\sqrt{3K}$ are all modifications of the mutual blocking method. Description has been made herein only of the sum, weighted sum and mean square root of the numbers of the subscribers who simultaneously use the respective frequencies, but it is also possible to effect mutual blocking by using other reasonable functions. As described above, the asynchronous synthetic communication system according to the present invention is characterized by counting the numbers of the same frequency which is simultaneously used about all the frequencies constituting the address codes of a plurality of simultaneous talking plurality of frequencies constituting the addresses of the said subscribers belonging to the same trunk station, and monitoring the S/N ratio in the trunk station by using any of the means for discriminating whether the respective counts are smaller than a predetermined threshold value or not and whether such a processed value as the product, sum, weighted sum or mean square root of the counts is smaller than a predetermined threshold value or not, thereby securing an improved S/N ratio for the subscribers.

Description will now be made of a variety of operations which are performed in the asynchronous communications system for enabling the subscribers to talk to each other. The operations result in the various functions constituting the novel features of the present invention. Especially because of asynchronous communication, a variety of limitations are imposed upon the modulation system and signal system. First, the connection operation will be described below.

When a call from a subscriber occurs, it is detected by one or more trunk stations in the neighborhood of the subscriber, and the detection signals are transmitted to the central station. Then a channel leading to the calling subscriber is established on the basis of the signals by the central station, and thereafter a dial tone is sent out. In accordance with the incoming dial information, the called subscriber is searched for. If a response is given by the called subscriber, then a channel is established between the trunk station to which the called subscriber belongs and the central station, and thus the connection is completed.

Figure 2:
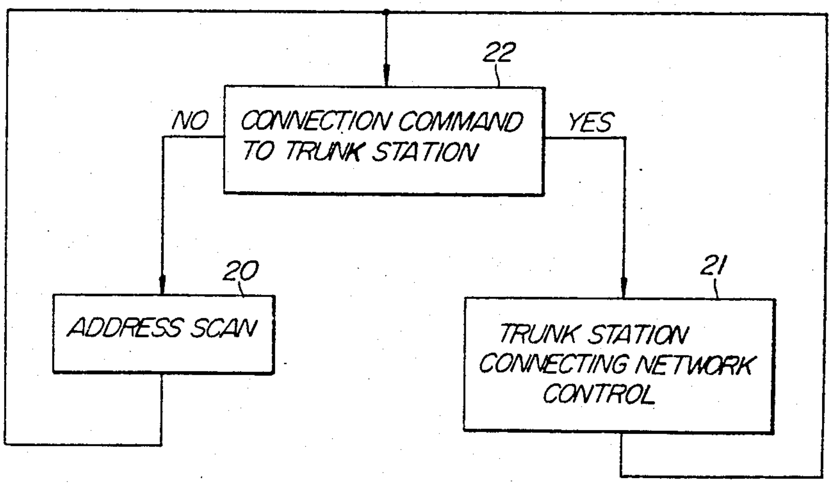
FIG. 2 is a flow chart of the trunk station controlling equipment.
Figures 3A, 3B, 4:
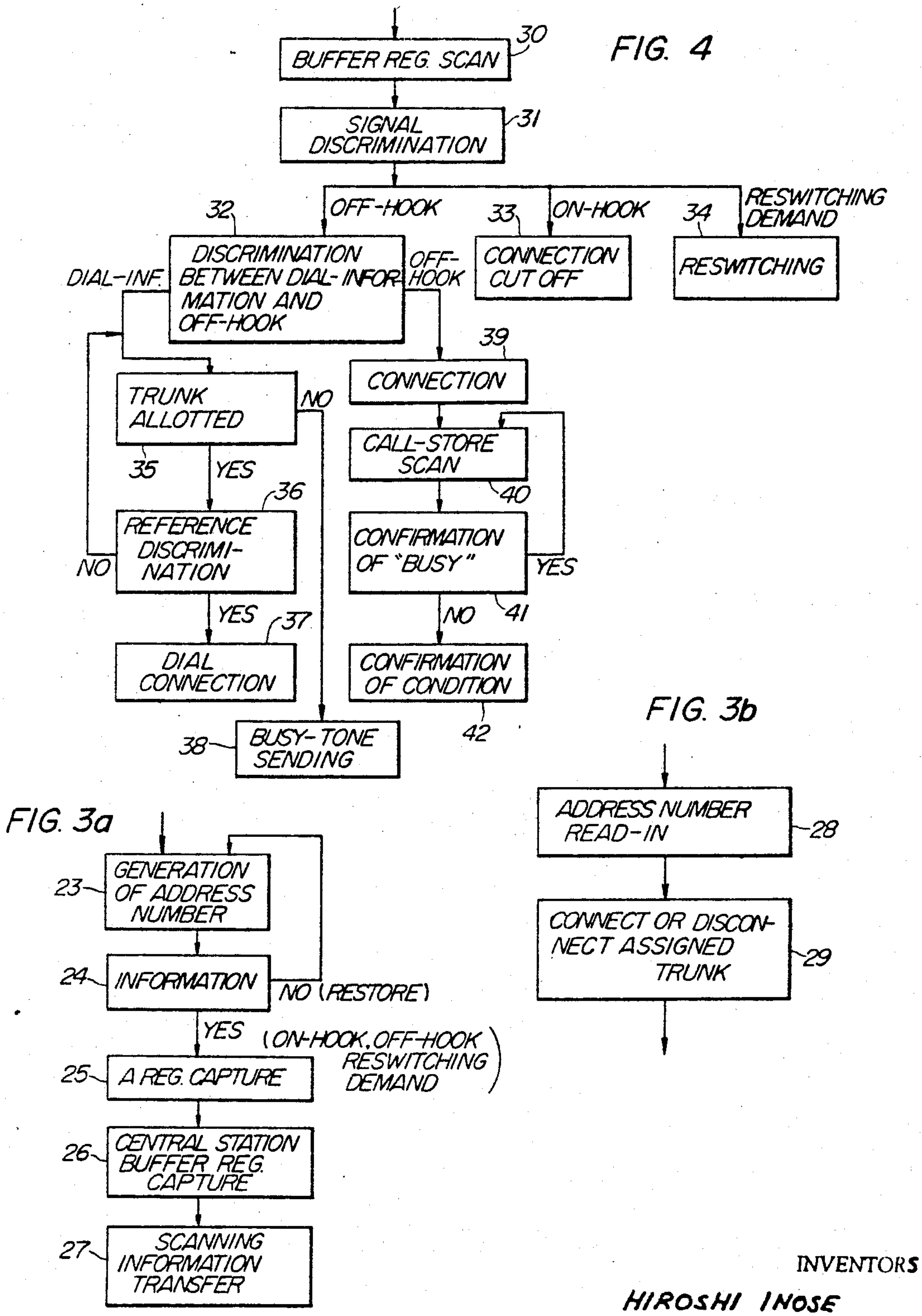
FIGS. 3*a*, 3*b* are views useful for explaining in detail the operation of said equipment.
FIG. 4 is a flow chart of the central station controlling equipment.

FIG. 2 is a flow chart representing the control operation of the trunk station. The control operation consists of address scan 20 and trunk station connecting network control 21. Detection is made of whether there is connection command from the central station to the trunk station or not. If there is no command, then the address of the subscribers are scanned at the trunk station in accordance with its own program. If there is such command, on the other hand, then the central station operates to interrupt the operation of the trunk station. The contents of these programs are shown in FIGS. 3a and 3b. The address scanning program is as shown in FIG. 3a. That is, the address numbers for subscribers are generated at 23 by trunk station control means, whereby a signal detecting circuit associated with an address demodulating network is scanned. The scanning of the detector circuit results in any of four types of information 24 such as "on-hook", "off-hook", "reswitching demand" and "restore". When the "restore" information occurs, the next address is scanned. However, when information other than "restore" occurs, it is transferred to the A register incorporated in the control means so as to be stored by the A register 25. Further, a central station buffer register is captured at 26 through a control line, and the content of the A register is transferred to the buffer register as scanning information 27. Thereafter, the address scan is again performed. When the address is scanned in accordance with the instruction from the central station, the information of the address provided by the central station is detected so as to be transferred to an assigned buffer register.

The trunk station connecting network controlling program is as shown in FIG. 3b. That is, connection or disconnection 29 is effected between the channel terminal for each subscriber provided in the address demodulating network of the trunk station and an appointed trunk connecting the trunk station and the central station. Thus, a subscriber address number instructed by the central station is read in 28, so that connection or disconnection 29 is effected between the subscriber channel terminal corresponding to the address number and the assigned trunk line.

FIG. 4 is a flow chart representing the control operation of the central station. The buffer register is scanned by the central control device so that detection is made of whether there is a demand for service from the trunk station (buffer register scan 30). If there is such demand, then discrimination is made of whether it is "off-hook," "on-hook" or "reswitching demand" (signal discrimination 31). For "on-hook," connection cutoff operation 33 is performed, and for "reswitching demand," reswitching operation 34 is performed. For "off-hook," further discrimination is made of whether it represents a dial-information or a "off-hook" (discrimination between dial-information and off-hook 32). For dial-information, a trunk is allotted to the trunk station which has detected the dial-information (trunk line allotment 35), the S/N ratio in the trunk station is checked (reference discrimination 36), and thereafter dial-information is given to the calling subscriber to commence dialing. Then the called subscriber is identified in accordance with the dial-information (dial connection 37) and receives the ringing signal. If there is no idle trunk line after the trunk line allotting operation 35 have been performed, then a "busy" tone 38 is sent to the calling subscriber. When "off-hook" is detected, the status is identified to be that of the called subscriber, and a trunk is allotted thereto to establish a channel (connection 39). Then the call store is scanned 40, and if the called subscriber number was written in the call store, the called subscriber is confirmed as busy 41, if not, after the confirmation of condition 42, the called subscriber is identified as responded to the ringing. These operations are performed by the respective programs which are stored in program store. When these operations are performed the information concerning the conditions of the subscribers is stored in call store (M registers, O registers, etc.), and information concerning the addresses and numbers of the subscribers is stored in the address store. The O registers are provided to each of the subscribers being controlled and in which is stored information concerning subscriber addresses, the trunk station to which the subscriber belongs, the talking path in the switching network, mate subscribers and charges. Detailed description will now be made of the operation of the central controlling device. Those programs which represent the control functions are shown in FIGS. 5a to 5h.

Figure 5A:
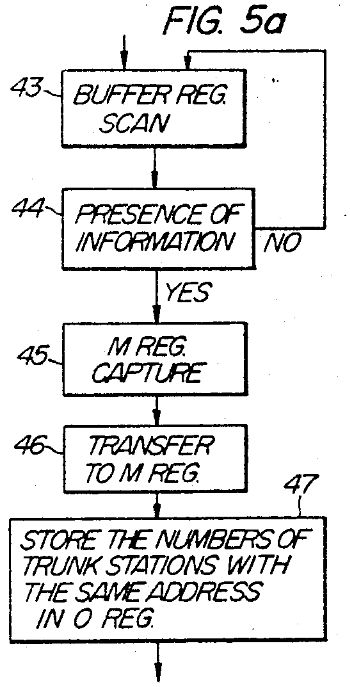
FIGS. 5*a* to 5*h* are views useful for explaining the controlling function of the equipment shown in FIG. 4, respectively.

The buffer register scanning program is as shown in FIG. 5a. That is, the addresses of the buffer registers are successively generated to scan the buffer registers 43, thereby detecting whether there is information 44 from the trunk station or not. If there is such information, then the M register in the call store is captured 45, and the information is transferred 46 to the M register. In this way, information from the trunk station concerning the address number, trunk station number, subscriber's condition, etc. is stored in the M register. An occasion may arise in which information coming from the same address (subscriber) is received by a plurality of trunk stations so that the contents of the buffer registers overlap. On such occasion, the number of the trunk stations with the same address are stored at 47 in the O registers (Ad, station, X, station, X .....).

Figure 5C:
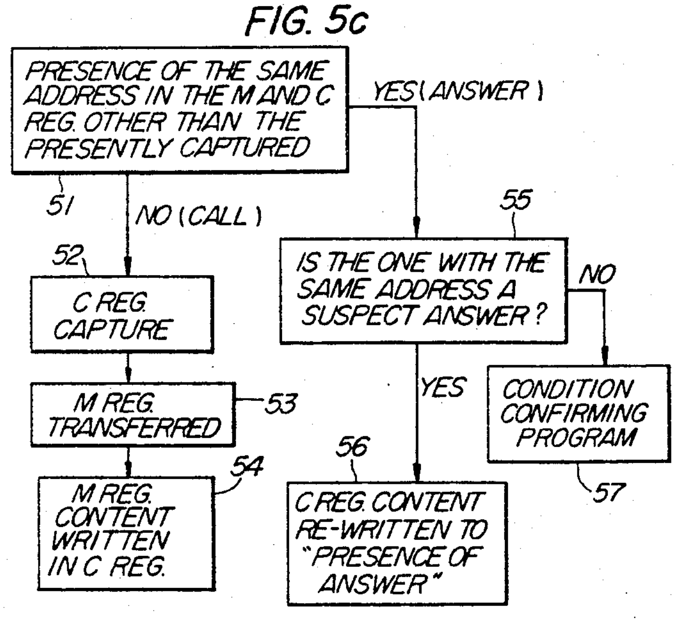
Figure 5D:
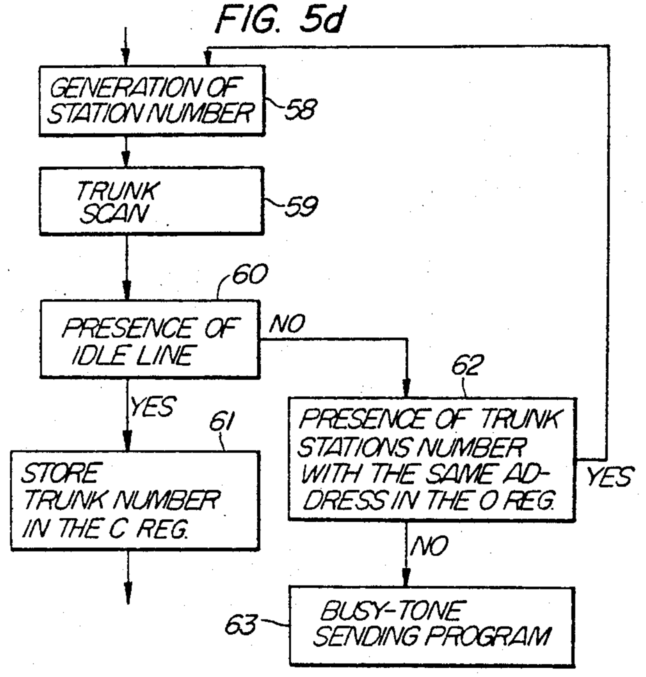
Figure 5B:
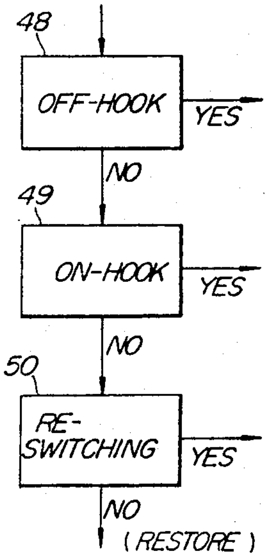

The signal discriminating program is as shown in FIG. 5b. The information stored in the M register is detected in accordance with the program of "off-hook" 48, "on-hook" 49 and "reswitching demand" 50 as to whether it is "off-hook" M ($Ad_1$, station, "off-hook"), "on-hook" M ($Ad_1$, station, "on-hook") or "reswitching demand" M ($Ad_1$, station, reset).

The call-response discriminating program is as shown in FIG. 5c.

Both in cases where a new call is made and in cases where a handset is hooked off, the same "off-hook" signal is received by the station. Therefore, discrimination 51 is made of whether the same address is written in the other M and C registers than the presently captured ones. If it is not written it is identified as a new call, and the C register is captured 52, and the M register content is transferred thereto so that the content is written 54 in the C register in such a form as C ($Ad_1$, station, New Call, X). If on the other hand, the same information is written, it is suspected as an answer and a C register of which the $Ad_2$ portion conforms to the address $Ad_1$ of the M register is selected, and the C register content is rewritten 56 to the "presence of answer" state C ($Ad_1$, station, Answer, trunk line, $Ad_2$, X) through the operation of "Is the one with the same address a suspect answer 55. In the operation 55, if there is no such C register, then the condition confirming program 57 is carried out. The trunk allotting program is as shown in FIG. 5d. The trunk station number is read out of the M register, and the station number is generated 58. Subsequently, trunk line 59 is effected, and discrimination and selection are performed with respect to an idle trunk 60 between the trunk station and the central station. If there is an idle trunk, then the number of the idle trunk is stored at 51 in the C register C ($Ad_1$, Station, Line Idle, Trunk Line). If the trunk is occupied, search is made of the number of the other trunk station with the same address in the C register, and selection is made of an idle trunk in the same manner as described above. If there is an idle trunk, then it is memorized C ($Ad_1$, Station, Line Idle, Trunk Line). If there is no idle trunk, then communication cannot be achieved C ($Ad_1$, Station, Suspect Busy), and therefore the "busy tone" sending program is carried out.

Figure 5E:
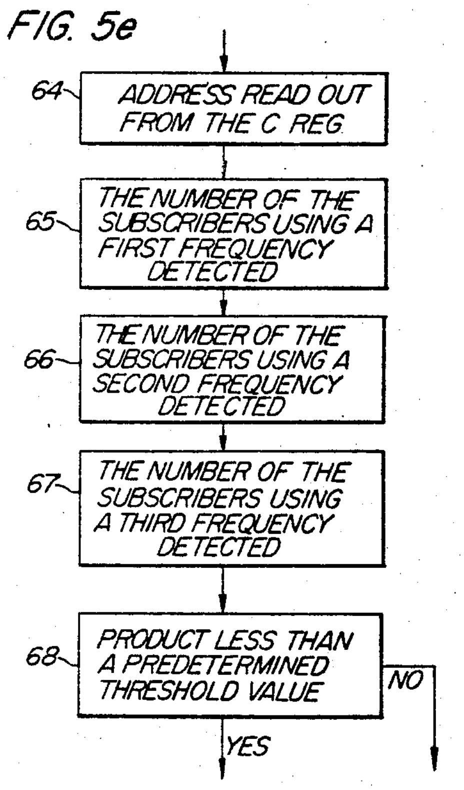

The reference discriminating program is as shown in FIG. 5e. This program is to monitor the S/N ratio in each trunk station for the purpose of determining whether the S/N ratio goes below a standard value when a call is connected. It is difficult to quantitatively monitor S/N ratio of each subscriber in a trunk station. Therefore, use is made of any one of the foregoing estimation methods. The S/N ratio of each subscriber is represented by the product of the numbers of simultaneously speaking subscribers using three frequencies constituting the address thereof. The three frequencies from the call stores (C registers) are used, address is read 64 out of the C registers belonging to the same trunk station, the numbers of subscribers using the first, second and third frequencies are detected at 65, 66 and 67, and determination is made of whether the product of such numbers is smaller than a predetermined threshold value at 68. If the product is smaller than the threshold value, then it is judged that the S/N ratio is higher than a certain value C ($Ad_1$, Station, SNOK, Trunk Line, X). The dial connecting program is as shown in FIG. 5f. First, the contents of the C registers are read out at 68, and connection command 70 is sent to a particular trunk station to connect the channel terminal for the particular called subscriber with a particular trunk, thereby completing the connection C ($Ad_1$, Station, Office Connected, Trunk Line, X). The dial receiver is captured at 71 to be ready for reception of a dial information C ($Ad_1$, Station, Suspect Dial, Trunk Line, X), and thereafter the dial tone (instruction) is sent to the calling subscriber in accordance with the dial tone sending program 72. Dial information received by a dial receiver is translated into the address ($Ad_2$) of the called subscriber in accordance with a dial translating program 73. Further, it is transferred at 74 to the C register. Subsequently, the trunk station and trunk line for the called subscriber are selected. In order to select the trunk station for the called subscriber, the trunk stations are scanned by successively generating trunk station numbers 75, and the trunks are scanned for every trunk station number in accordance with a trunk allotting program 77. "Yes" represents the case where there is an idle trunk. The called subscriber with the address read in the C register at the selected trunk is enabled to speak, so that it is judged in accordance with a reference judging program 78 whether the S/N ratio of the circuit is lower than the reference threshold value. Thus, "yes" represents the case where the S/N ratio of the circuit is higher than the threshold value. In this case, the trunk station number and trunk line number are stored 79 in the O register, and thereafter the generation of the trunk station number 75 is interrupted so that the trunk station scan is ended. If an idle trunk line is found during the trunk allotting scan 77 during this process, then there occurs a "no" signal, and thus the other trunk station number is immediately generated at 75. The same operation is repeated. In the case of the reference judging program, too, another trunk station number is similarly immediately generated at 75 when the S/N ratio of the circuit at the trunk station becomes lower than the threshold value, and the same operation is repeated. In the reference judging program, if the S/N ratio of the circuit at the trunk station becomes lower than the threshold value, then another trunk station number is immediately generated at 75, and the same operation is repeated. When a suitable trunk station and trunk are selected, the generation of trunk station numbers 75 is ended, and this is detected in accordance with the generation end discriminating program 76. Thus the next operation is initiated. That is, it is first judged whether the trunk station number 80 is stored in the thus selected O register. If there is no trunk station number, then there occurs a "no" signal. Since no suitable trunk station could be found, a busy tone is immediately sent to the calling subscriber in accordance with the busy tone sending program 81. If the trunk station number is in the O register, trunk station numbers are further read out of the O register (read-out from the O register 82), and thus instruction for connection 84 is sent to the trunk station which corresponds to the called subscriber's address ($Ad_2$) stored in the C register. When the instruction is sent out, the read out of the O register is ended at 83. After this has been discriminated, a ringing tone is sent out by the trunk station in accordance with a ringing signal sending program 85 for the called subscriber, and a ring-back tone is sent to the calling subscriber. At this point, the content of the C register becomes C($Ad_1$, Station, Calling, Trunk Line, $Ad_2$).

The central station connecting network controlling program is as shown in FIG. 5*g*. The trunk numbers for the subscribers in the C registers and the trunk numbers in the M registers which have been registered in accordance with the response or reswitching demand are read out at 89, and the path therebetween is selected for path selecting connection 90 so that it is stored in the C register 91 C ($Ad_1$, Station, Line Connected, Trunk Line, Path, X).

Figure 5H:
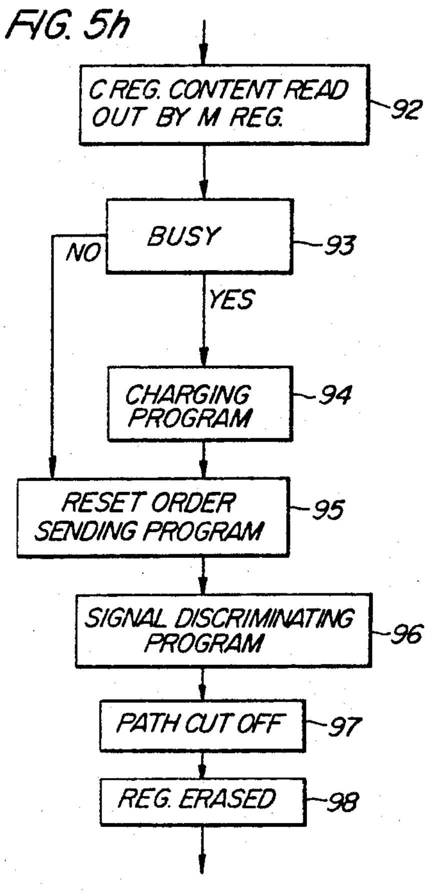
Figures 5F, 5G:
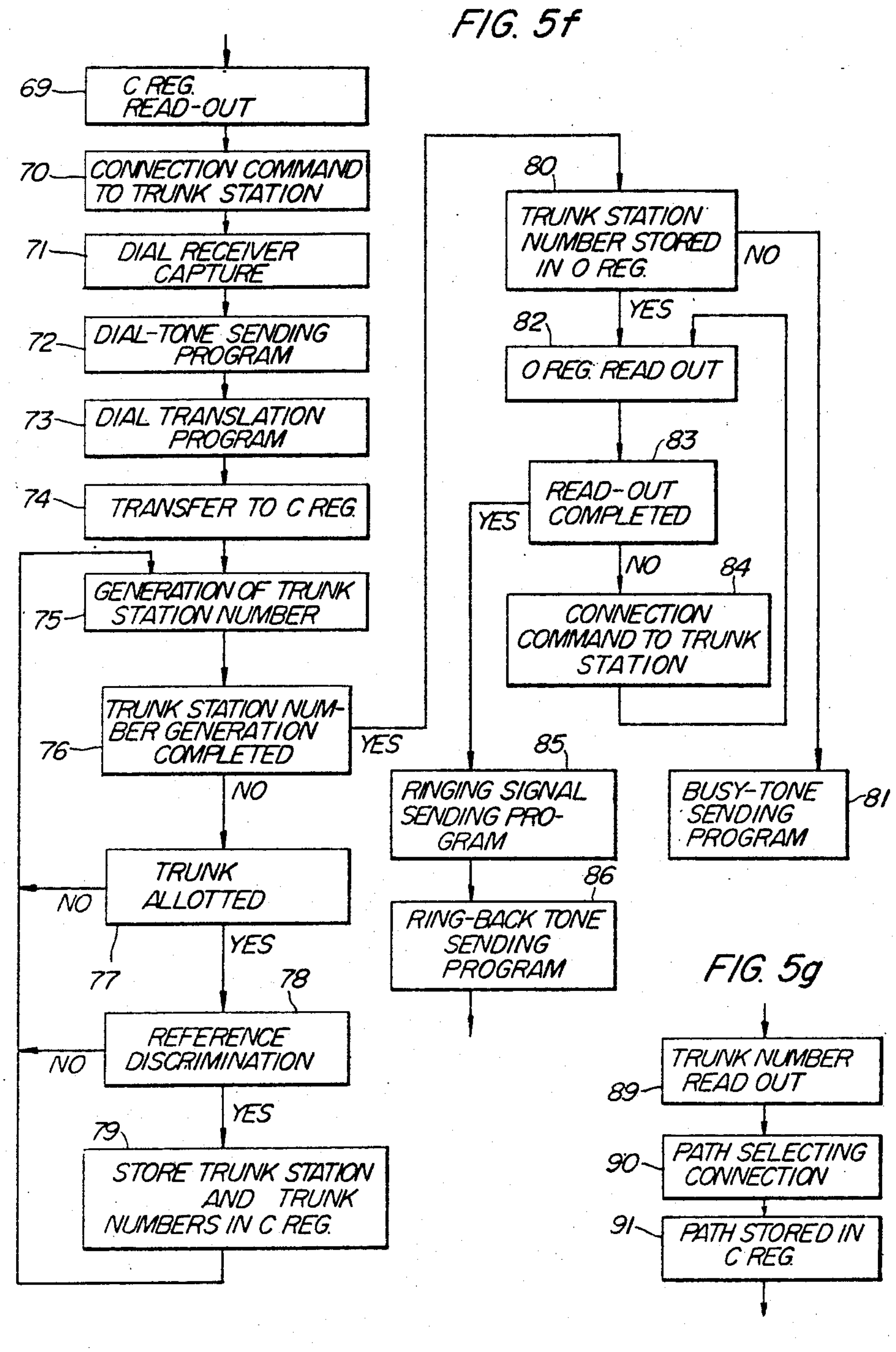

The connection cutoff program is as shown in FIG. 5*h*. When "on-hook" information is detected from the M register, the subscriber number is read out of the C register (C register read out 92 by the M register). After "busy" is confirmed, the content of the C register is sent to a charge calculation tape in accordance with a charting program 94. A reset instruction sending program 95 is sent to the on-hooked subscriber, and this is detected by the subscriber instrument so that the transmission of the "on-hook" signal is interrupted. Thus, the fact that the subscriber has performed "reset" is confirmed in accordance with a signal discriminating program 96, and then the path is cut off at 97. Thereafter, the registers are erased at 98.

In addition to the connecting operation thus described, other operations such as confirmation of "busy", reswitching, monitoring, servicing and so forth are performed.

Figure 6B:
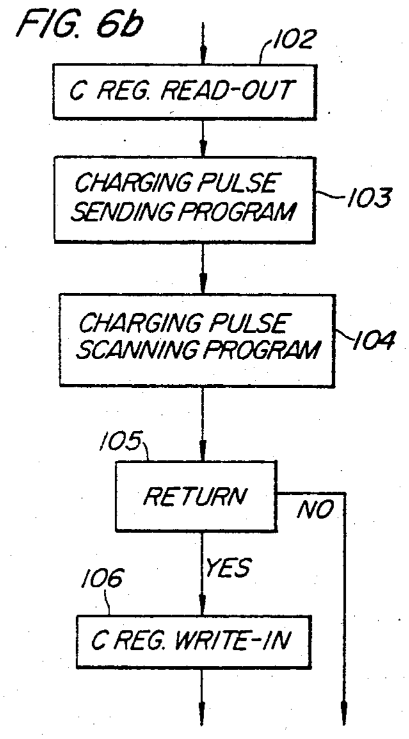
FIGS. 6*a* to 6*c* are views useful for explaining the monitoring function thereof, respectively.
Figure 6A:
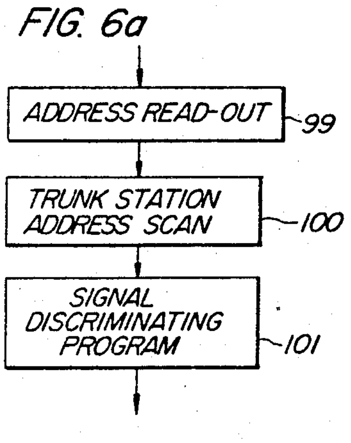
Figure 6C:
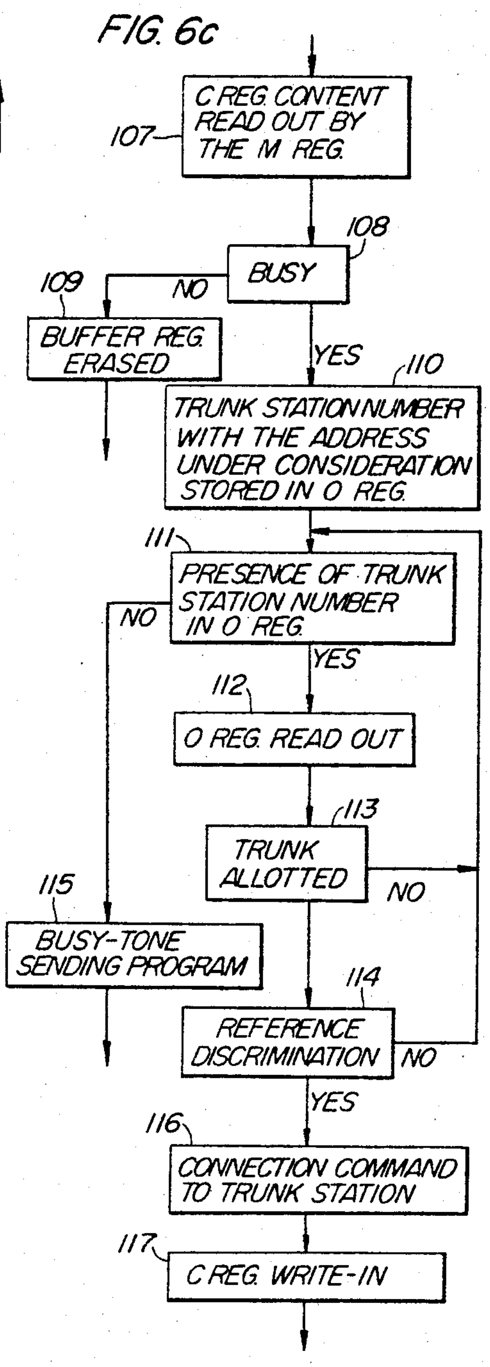

FIGS. 6*a* to 6*c* are flow charts representing the monitoring operation.

The condition confirming program is as shown in FIG. 6*a*. In accordance with the present invention, if the subscriber does "on-hook," "off-hook" or "reswitching demand," the resulting signal continues until it is detected by the central station, and once such detection has been effected by the station, the signal transmission is interrupted in accordance with the instruction. However, the signals from the subscribers are demodulated at the trunk station. When it is desired to directly confirm the condition of a subscriber, the address of the subscriber who desires to be confirmed is read out at the central station 99, the respective subscriber terminals at the trunk station are scanned, trunk station address scan 100 is effected to locate a terminal which corresponds to the address, and the resulting signal is discriminated in accordance with a signal discriminating program 101.

The "busy" confirming program is as shown in FIG. 6*b*. Much noise may be present in the radio circuit between a subscriber station and a trunk station, so that there is a possibility that a signal from a subscriber may be erroneously detected at the trunk station. In order to be able to discriminate whether a subscriber is busy ro not, in some cases, it is not sufficient to monitor the signal detecting circuit terminals at the trunk station. Therefore, the subscriber station devices should also be monitored. To this end, "busy" C registers are read out at 102, and charging pulse tone is sent into the channel in accordance with a "busy" confirming and charging pulse sending program 103. When the charging pulse tone is detected by a subscriber station device, it is sent back in return. This is detected in accordance with a charging pulse scanning program 104. If the charging pulse tone is sent back, then the subscriber is suspected to in the "on-hook" state. Upon confirmation of the sending back, the "write" operation of the C register is started, and one charge digit of the C register is counted to record the duration of the call. The reswitching demand program is as shown in FIG. 6*c*. Suppose that a subscriber has moved while calling so as to become remote from the trunk station to which it belonged at the time when "off-hook" was effected. Then the intensity of the received field becomes lower, resulting in a decrease of the S/N ratio.

If the S/N ratio is very much decreased, then the subscriber is suspected to be in the "on-hook" state in accordance with the "busy" condition confirming program, so that it is disconnected from the station. If the subscriber transmits a reswitching demand signal to another trunk station before such disconnection is effected, the signal is detected by the signal detecting circuit at the trunk station, and the demand for reswitching is written in the M register in accordance with the signal discriminating program. The C register is read out at 107 by the M register to confirm that the subscriber is still in a talking state 108. Then, the number of a trunk station with the address which received the reswitching demand signal is stored in the O register 110 and read out (O register read out 112) to effect trunk allotment 113 with respect to the trunk station and S/N standard discrimination 114 within the station. If the trunk is blocked or if the S/N standard is not satisfied in the S/N standard discrimination, then similar operation is performed with respect to another trunk station registered in the O register. If there still is no idle trunk line or if the S/N standard is not met after such operation has been performed repeatedly, then the discrimination is effected in accordance with information concerning the presence of the trunk station number in the O register, and thus a busy tone is sent to the subscriber who has made the reswitching demand in accordance with a busy tone sending program 115. On the other hand, if an idle trunk line is found and the S/N standard is satisfied after the operation described above has repeatedly been performed, then the channel is switched to the newly selected trunk station in accordance with the connecting instruction to the trunk station. This is written in the C register and stored therein. Thus the operation is completed.

Description will now be made of the priority function.

Generally speaking, in a communications system, the number of the trunks between each trunk station and the central station is limited. In an attempt to monitor the S/N ratio in each trunk station by some means to thereby control calls, the number of subscribers who speak simultaneously is naturally restricted. Since the subscribers are permitted to be mobile, there will occur such occasions that it is required that simultaneous communications such as general instructions can be achieved and that it is desired that emergency calls be connected with higher priority than ordinary calls. Thus, it is desirable that priority connection is provided corresponding to the degree of importance or emergency of communications. In actual communications, it is appropriate to send information concerning priority together with the dial information. In such priority communications, if the trunk station is already in the blocked state when the trunk line connection and standard discrimination are to be effected subsequent to the detection of a dial information, and the call to be connected is of higher priority than any of the already connected calls, then that one of the calls which is of lower priority is disconnected to establish a channel for the higher preference call. In this case, a suitable form of advance notice should be given to the subscriber making the lower priority call to be disconnected, and also service should be provided to the subscriber to enable the disconnected subscriber to be preferentially returned to the speaking condition after the higher priority call ends.

Figure 7B:
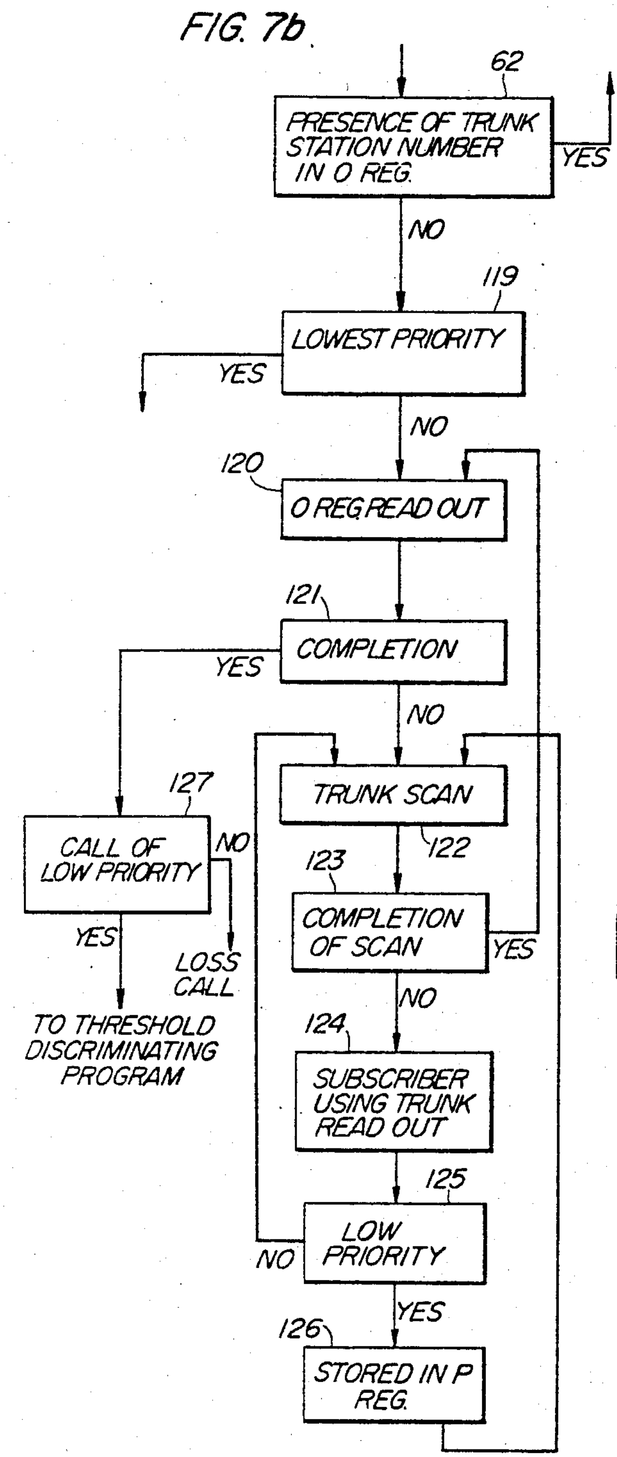
FIGS. 7*a* to 7*c* are views for explaining the priority function thereof, respectively.
Figure 7A:
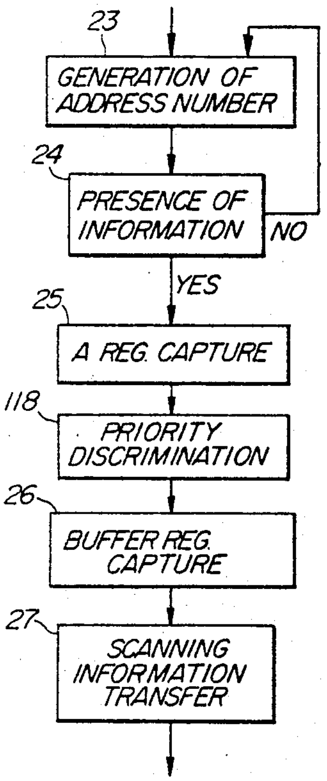

The asynchronous communications system according to the present invention is also characterized by being equipped with such a priority function. For priority communications, the following programs are used in addition to the above-described operational program. FIGS. 7*a* to 7*b* are flow charts showing such additional programs. The address scanning program is as shown in FIG. 7*a*. That is, if any other information than "return to the original condition" is detected by the detector circuit in accordance with the trunk station address scanning program as shown in FIG. 3*a*, then a priority judging receiver is connected with the channel terminals of the address demodulator, so that such information is transferred to the buffer register at the central station together with the result of the priority judgement 118. In case provision is made for means for enabling a subscriber equipment to send out a signal representing priority without any "on-hook" signal, elements for detecting such priority signal are simultaneously scanned in accordance with the address scanning program, so that the signal is sent to the central station together with other information.

The trunk line allotting program for priority communications are as shown in FIG. 7*b*. In case no idle trunk line is located as a result of the line locating operation performed in accordance with the trunk line allotting program as shown in FIG. 5*d*, detection is made of whether the call being handled is of the lowest priority (lowest priority 119), and if it is not of the lowest priority, then a signal "no" is provided so that the trunk station numbers are sequentially taken out of the O register (O register read out 120), and the trunks belonging to each trunk station are scanned. At this point, the subscribers using the trunks are read out at 124 for every trunk being scanned, the preference of each subscriber is compared with that of the call being presently handled (lower priority 125), and if the former is not lower than the latter, then other trunk lines are sequentially scanned so that the same operation is repeated. In case all the trunk lines have been scanned while no subscriber of lower priority than that of the presently handled call is located, completion of scan 123 is detected. In such case, another trunk station is read out of the O register (O register read out 120), and similar operation is repeated. If, as a result, a subscriber of which the priority is lower than that of the presently handled call is located, then the subscriber is memorized in the P register at 126. At the same time, the trunk line scan 122 is interrupted, the end of scan is detected, and thus the read out of the trunk station numbers O register is ended. The design is made such that the read out just described is ended when all the trunk station numbers are read out. In either case, when the end of read out 121 is detected, discrimination is made of whether a subscriber of lower priority has been memorized in the P register or not. If no subscriber of lower priority is located, then the presently handled call becomes a loss call, while if such lower priority subscriber is found, then the next standard judging program is initiated.

Figure 7C:
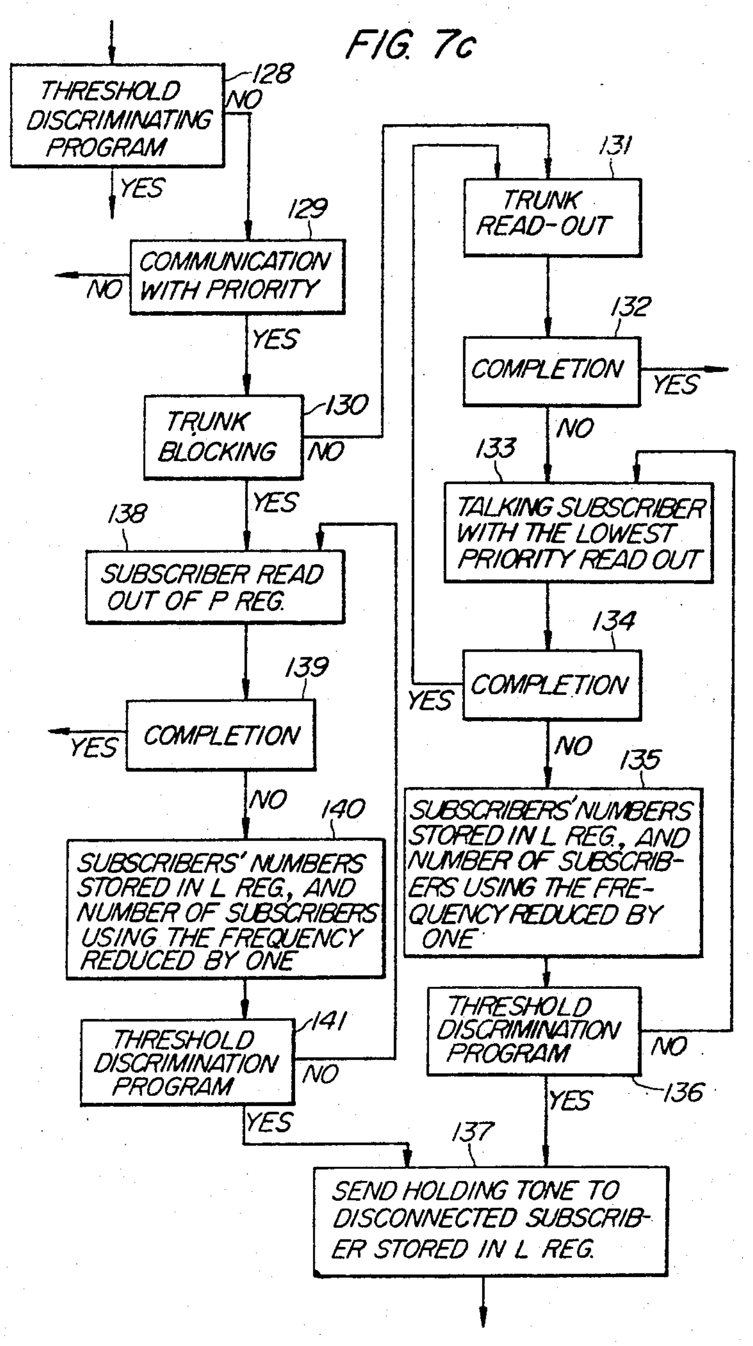

The standard judging program for priority communications are as shown in FIG. 7*c*. If the product of the numbers of simultaneously speaking subscribers using the same frequencies as those of calls being presently handled is less than a predetermined value, then it is judged that the S/N standard is satisfied. In case the S/N standard is not met, then the following process is carried out. First of all, it is confirmed that a call is not of the lowest priority (Priority communications 129). When an idle trunk line is found at the section of "Are the trunks in the blocked state " 130 in accordance with the trunk allotting program, the trunks now in use at the trunk station are sequentially read out at 131, and a talking subscriber of lower priority than that of the call being presently handled is read out at 133. Here, such lower priority calls are stored in an L register and temporarily disconnected. The number of the frequencies used by those lower priority calls are reduced by one, an instead the call being presently handled is permitted (the subscriber numbers are stored in the L register and the number of the subscribers using the frequency is reduced by one 135). At this point, judgment is made of whether the S/N standard is satisfied at the trunk station in accordance with standard judgment program 136. If such standard is not met, then lower priority calls are read out at 133 until the standard is satisfied. If a desired call is located, then it is disconnected to establish a channel for the call being presently handled, and a holding tone is sent to the disconnected subscriber 138. On the other hand, in case no idle trunk is found in accordance with the trunk allotting program (Are the trunks blocked 130), the calls stored in the P register are sequentially read out (trunk read out 131) to find a call satisfying the standard through the processes 138, 139, 140 and 141. Then the thus found call is disconnected, and the call being presently handled is connected.

In such priority communications, it often happens that a talking subscriber is disconnected because of a call of higher priority, but it is proper that such disconnected subscriber is returned to the original state as soon as the circuit becomes idle. That is, information concerning the disconnected call is stored in a storage, and a holding tone is sent to the disconnected caller. Upon detection of the end of speech of any other subscriber, the standard judgment is effected with respect to the waiting caller. If the standard is satisfied, then the caller is preferentially connected; while unless such standard is met, the standard judgment is effected with respect to a caller who is next in waiting order. The buffer scanning program is not started until those processes are completed.

In the foregoing, description has been made of the various functions of a control system for the asynchronous communications system according to the present invention. Description will now be made of an arrangement for achieving the foregoing various functions.

Figure 8:
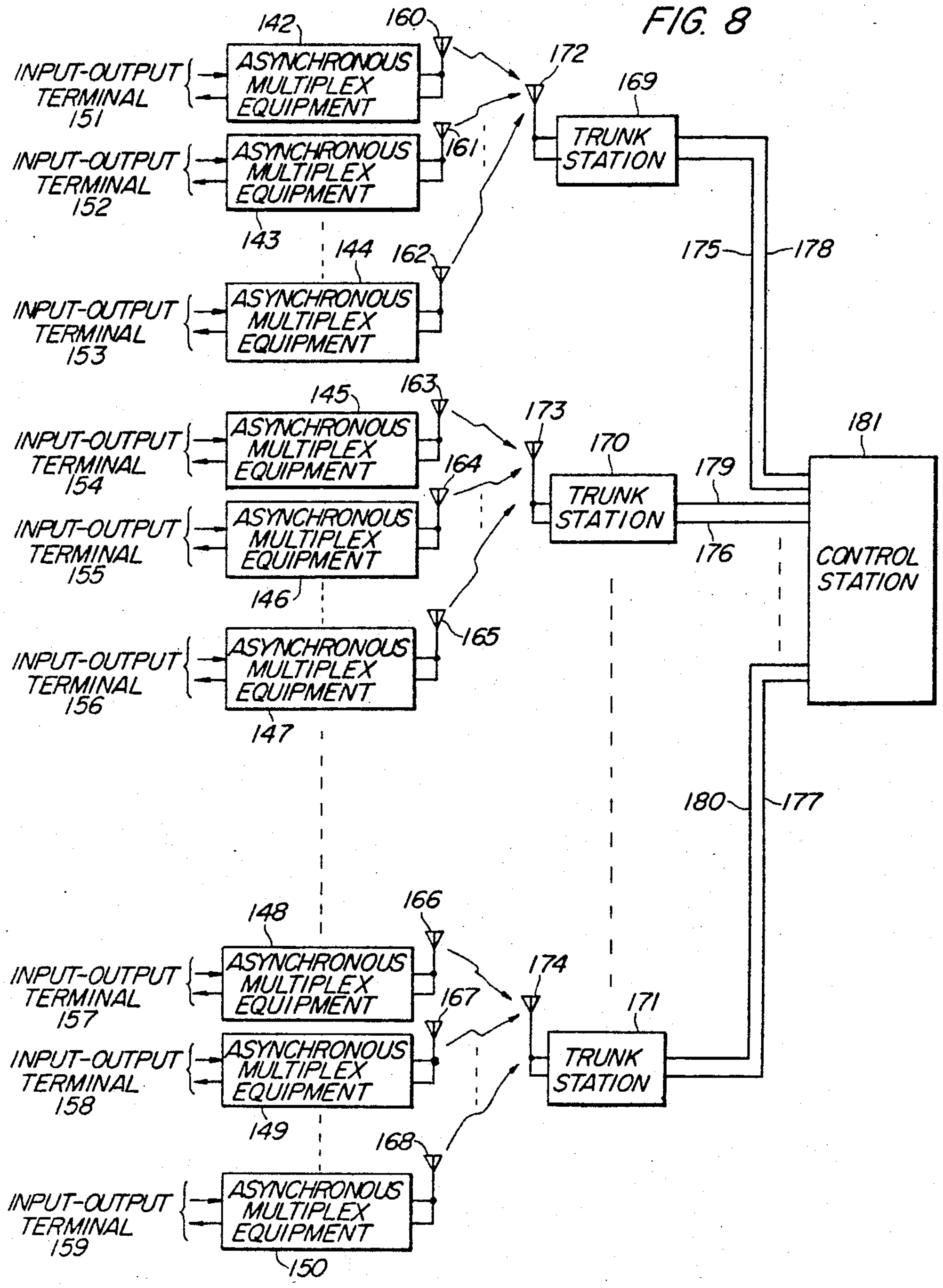
FIG. 8 is a block diagram showing the entire arrangement of the asynchronous communications system according to the present invention.

FIG. 8 is a simple block diagram illustrating the entire arrangement of the asynchronous communications system according to the present invention, which comprises the subscriber stations, trunk stations and central station as described above. Referring to FIG. 8, the reference numerals 142, 143, ...., 150 represent asynchronous multiplex equipment in the subscriber stations, 151, 152, ...., 159 input-output terminals associated with the equipment 142, 143, ...., 150 respectively, and 160, 161, ...., 168 transmitting-receiving antennas associated with the equipment 142, 143, ...., 150, respectively. The reference numerals 169, 170 and 171 denote trunk stations, and 172, 173 and 174 transmitting-receiving antennas associated with the trunk stations 169, 170 and 171 respectively. Each of these trunk stations communicate with a predetermined number of subscriber stations. The example shown in the drawing is such that the subscriber stations 142, 143, 144 are controlled by the trunk station 169. The trunk station 169, 170 and 171 are connected with a central station 181 through trunks 175, 176 and 177, respectively. The connection between the trunk stations and the central station is also established through control lines 178, 179 and 180. Thus, the central station 181 controls the trunk stations 169, 170 and 171.

Figure 9:
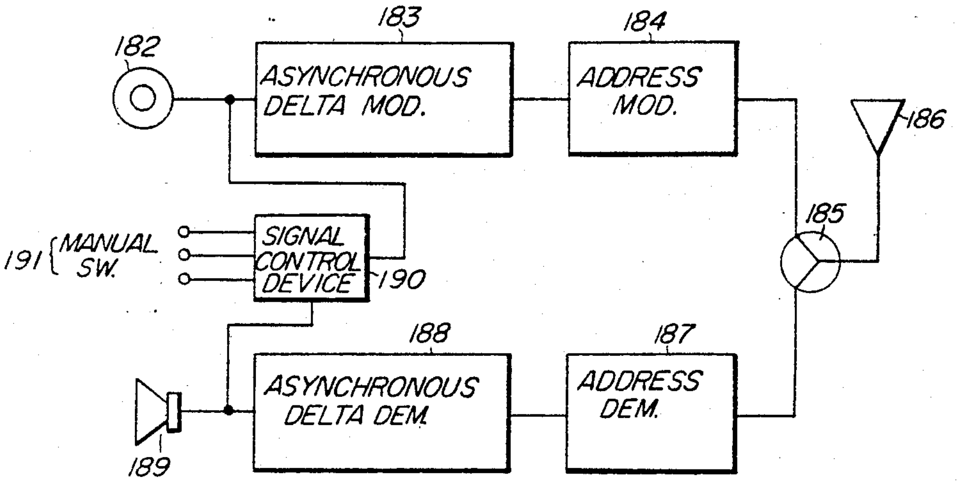
FIG. 9 is a block diagram showing the subscriber station.

FIG. 9 is a block diagram showing the subscriber station, which comprises a transmitter 182, asynchronous delta modulator 183, address modulator 184, duplexer 185, transmitting-receiving antenna 186, address demodulator 187, asynchronous delta demodulator 188, receiver 189, on-off hook (interlocking with the handset), signal control means for controlling signals such as a dial signal, reswitching demand signal and so forth, and input switch 191.

Figure 10A:
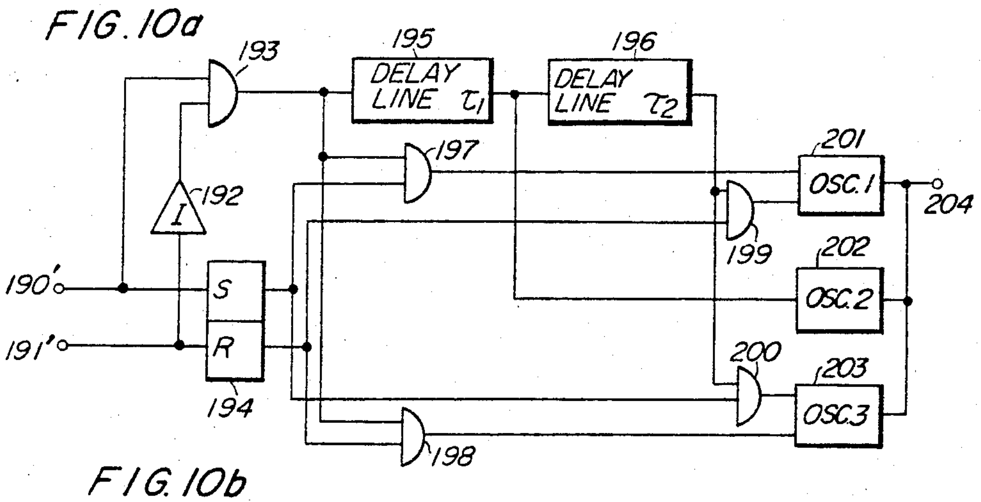
FIGS. 10*a* and 10*b* are diagrammatic views showing the address modulating and demodulating systems of the subscriber station, respectively.
Figure 10B:
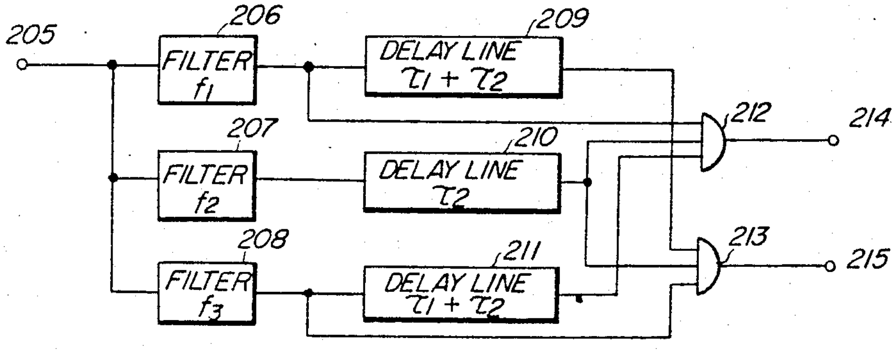

The asynchronous delta modulator and demodulator 183 and 188 respectively may by sufficiently simplified and of small size. The address modulator 184 comprises input terminals 190 and 191, inverter 192, AND gate 193, flip-flop 194, delay lines with time delays $\tau_1$ and $\tau_2$, AND gates 197, 198, 199 and 200, oscillators 201, 202 and 203, and output terminal 204, as shown in FIG. 10*a*.

The output terminal 190 is provided with a positive pulse output and the terminal 191 with a negative pulse output by the asynchronous delta modulator 183. In either case, three pulses occur which are in turn delayed by O, $\tau_1$, and $\tau_1 + \tau_2$ by means of the delay lines 195 and 196. The flip-flop 194 is set by a positive pulse and reset by a negative pulse so that the three pulses coming out of the delay lines are distributed to the three oscillators 201, 202 and 203 by means of the gates 197 to 200 connected with the flip-flop 194. Thus, for the positive pulses with the address of Ad $(f_1, f_2, f_3, \tau_1, \tau_2)$ occurs, while for the negative pulses with the address Ad $(f_3, f_2, f_4, \tau_1, \tau_2)$ occurs. Here, Ad $(f_i, f_j, f_k, \tau_l, \tau_m)$ indicates that a pulse having a frequency of $f_j$ is generated $\tau_l$ after occurrence of a pulse having a frequency of $f_k$ is generated $\tau_m$ after the pulse $f_j$ was generated.

The address demodulator comprises three filters 206, 207 and 208 having center frequencies $f_1$, $f_2$ and $f_3$ respectively, delay lines 209, 210 and 211 exhibiting time delays $\tau'_1 + \tau'_2$, $\tau'_2$ and $\tau'_1 + \tau'_2$ and connected with the filters 206, 207 and 208 respectively, AND gates 212 and 213, and output terminals 214 and 215. First, pulses separated by the filters 206, 207 and 208 are distributed through the delay lines 209 and 211, so that they are discriminated by the AND gates 212 and 213 as to whether they are Ad $(f_1, f_2, f_3, \tau'_1, \tau'_2)$ or Ad $(f_3, f_2, f_1,$ $\tau'_1$, $\tau'_2$). Thus, an output is obtained either at the terminal 214 or 215.

Figure 11:
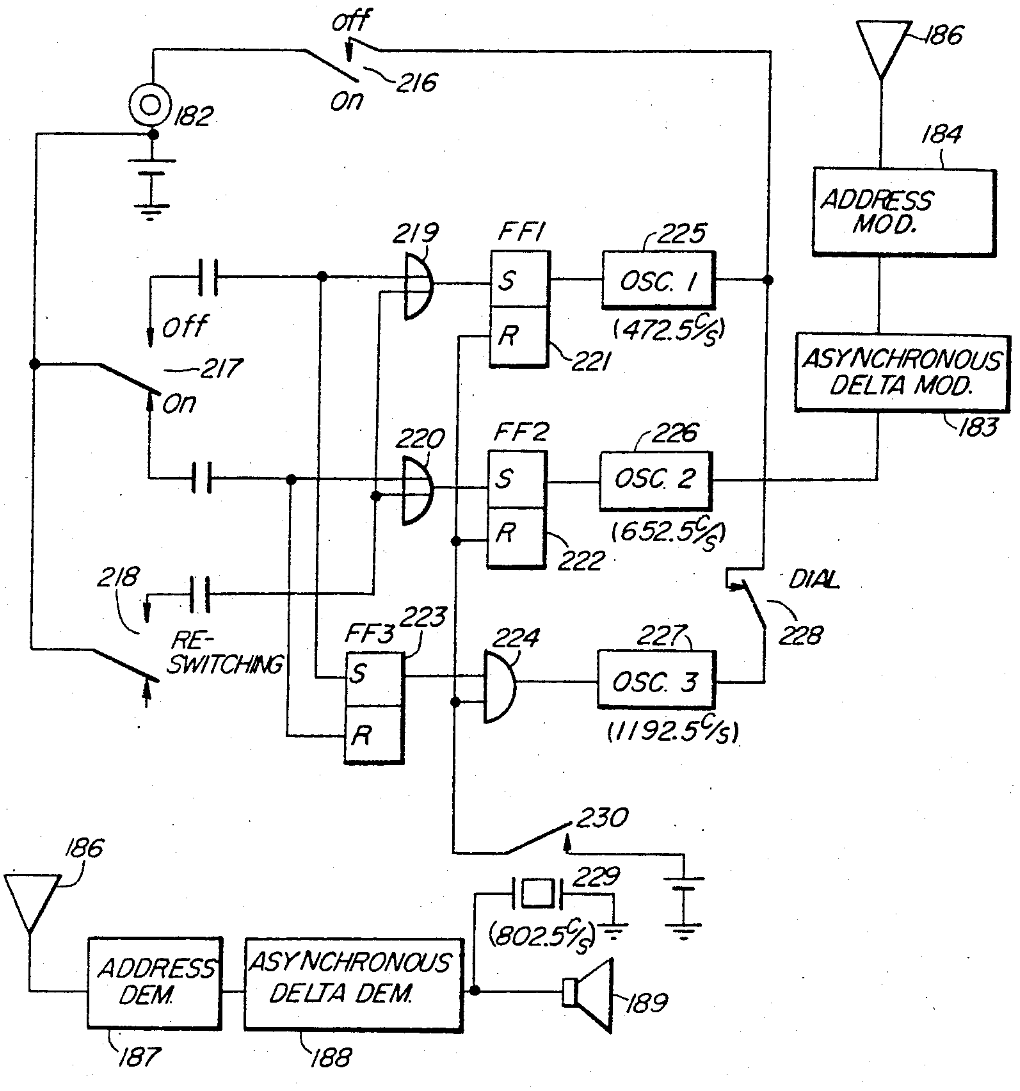
FIG. 11 is a block diagram showing the signal controlling equipment thereof.

The signal control device in the subscriber station is shown in FIG. 11. The device comprises on-off switches 216 and 217 adapted for interlocking with "off-hook" and "on-hook," reswitching demand switch 218, OR gates 219 and 220, flip-flops 221, 222 and 223, AND gate 224, low frequency signal generators 225, 226 and 227, dial switch 228, low frequency filter 229, and switch 230.

When the handset 182 is taken up by the subscriber, "off-hook" contacts of the switches 216 and 217 are connected with each other so that the flip-flops 221 and 223 are set. When the flip-flop 221 is set, an "off-hook" signal (for example, 472.5 C/S) is sent from the oscillator 225 to the modulator 183. Upon confirmation of such "off-hook signal," the central station transmits an instruction signal (for example, 802.5 C/S), which in turn is detected by the low frequency filter in the receiver to operate the switch 230. Thus the flip-flop 221 is reset so that the transmission of the "off-hook" signal 472.5 C/S is interrupted. At this point, a response signal (for example, 1192.5 C/S) is provided by the oscillator 227 since the flip-flop 223 has been set. The subscriber can hear the instruction signal from the station, and when he confirms it, he will dial with the aid of the dial switch 228. The resulting dial information is sent to the station together with the response signal which serves as carrier for the information. When the dialing operation is completed, the transmission of the instruction signal from the station is interrupted, and a "ring-back" tone or "busy" tone from the station is received.

Assume that the subscriber moves while speaking so that the distance between the subscriber and the station to which the subscriber belonged at the time of "off-hook" becomes greater, resulting in deterioration of the quality of speech. Then, the subscriber transmits a reswitching demand signal whereby the circuit is switched to the nearest trunk station. By depressing the reswitching demand switch 218, the flip-flops 221 and 222 are set so that reswitching demand signals (for example, 472.5 C/S and 652.5 C/S) are sent from the oscillators 225 and 226 to the station. When this is confirmed by the station, an instruction signal is sent to reset the flip-flops 221 and 222, thereby reswitching the trunk station. When the handset is placed in position by the subscriber so that "on-hook" contacts of the switches 216 and 217 are connected with each other, the flip-flop 222 is set while the flip-flop 223 is reset so that the oscillator 226 is caused to produce an "on-hook" signal (for example, 652.5 C/S) by means of the flip-flop 222. When this is confirmed by the station, an instruction signal is transmitted to the subscriber to thereby reset the flip-flop 222. Thus, the transmission of the "on-hook" signal is interrupted. Incidentally, a charging pulse signal which is an intermittent tone of, for example, 802.5 C/S is sent from the station to the subscriber. When this signal is detected by a low frequency filter (802.5 C/S), the switch 230 is opened and closed in synchronism with the charging pulses. Thus a sinusoidal wave signal, for example, 1192.5 C/S is sent from the oscillator 227 back to the station, so that the station is enabled to advise the subscriber of the duration of the call and confirm the talking condition. Further, when a subscriber is called, a ringing signal is sent to the subscriber by the station, and it is detected by a resonant circuit.

In the case of communications with priority service, it is required that a code representing the priority be transmitted with an "off-hook" signal as the carrier therefor or that means be provided to send a priority signal by using other means than "off-hook" signal.

As signal detectors and oscillators, it is appropriate to use vibrating reed filters and piezoelectric tuning forks which are conventionally been used for the purposes of selective calls, from the standpoint of stability, accuracy, selectivity, et. Preferably, the flip-flops and gate circuits are constituted by transistor circuits or integrated circuits rather than relays, as is the case with the asynchronous delta modulator and demodulator and address modulator and demodulator. By doing so, the subscriber station device can be miniaturized.

Figure 12:
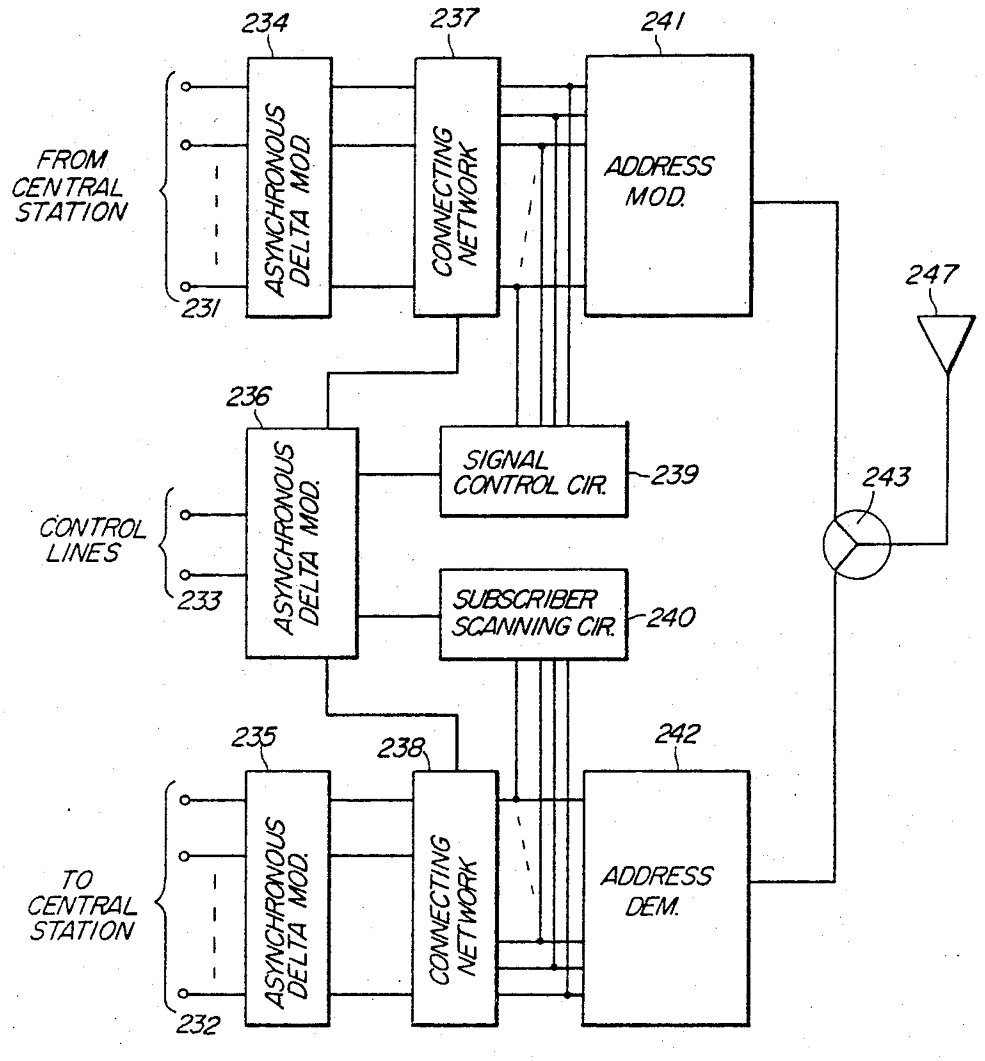
FIG. 12 is a block diagram showing the devices in the trunk station.

Referring to FIG. 12, there is shown in block form the trunk station equipment which comprises input terminals 231 for trunks from the central station, control lines 233 between the trunk station and the central station, asynchronous delta modulator 234, asynchronous delta demodulator 235, connecting networks 237 and 238, signal controlling circuit 239, subscriber scanning circuit 240, address modulator 241, address demodulator 242, duplexer 243 and transmitting-receiving antenna 247.

Since signals between the trunk station and the central station generally fall within the audio frequency range, the asynchronous delta modulator and demodulator 234 and 235 are associated with each trunk at the trunk station. The connecting networks 237 and 238 are adapted to connect the trunks with the respective subscriber terminals of the address modulator and demodulator 241 and 242. The number of the subscriber terminals corresponds to that of the contracted subscribers belonging to the service area of a particular trunk station, and the number of the trunks is equal to that of expected simultaneously talking subscribers in this station. Ordinarily, the ratio of the number of the subscriber terminals to that of the trunks is 10:1 or higher.

Figures 13A, 13B:
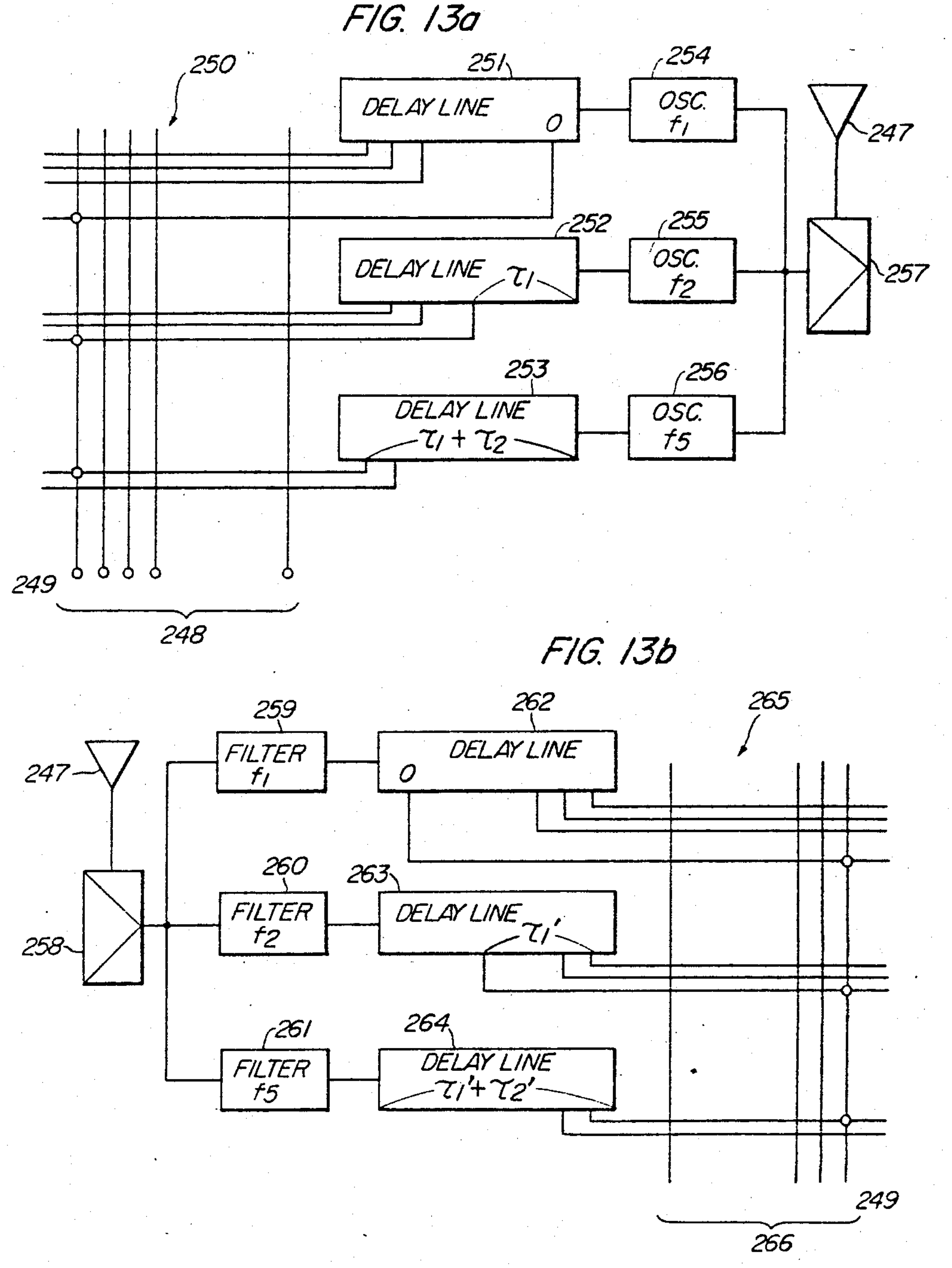
FIGS. 13*a* and 13*b* are block diagrams showing address modulating and demodulating systems thereof, respectively.

The address modulator comprises input subscriber terminal group 248, address constituting network 250, delay lines 251, 252 and 253, oscillators 254, 255 and 256 associated with the delay lines 251, 252 and 253 respectively, and radio frequency amplifier 257, as shown in FIG. 13*a*. The address constituting network 250 is formed by connecting the taps of the subscriber input terminals 248 and those of the delay lines 251, 252 and 253 with each other. Upon arrival of a pulse at the terminal of the subscriber 249, for example, the oscillator 255 is caused to produce a frequency $f_1$ with delay O, the oscillator 256 a frequency $f_2$ with delay $\tau_1$, and the oscillator 257 a frequency $f_3$ with delay $\tau_2$. Thus, address Ad ($f_1$, $f_2$, $f_3$, $\tau_1$, $\tau_2$) for the subscriber 249 is composed.

FIG. 13*b* is a block diagram showing the address demodulator incorporated in the trunk station equipment. As will be seen from the drawing, the address demodulator comprises radio-frequency amplifier 258, filters 259, 260 and 261, delay lines 262, 263 and 264, address separating network 265, and subscriber input terminals 266, which are arranged in the opposite order to the case of the address modulator. The address separating network 265 is constituted by connecting different taps for the respective delay lines 262, 263 and 264 through AND gates. If an address Ad ($f_3$, $f_2$, $f_1$, $\tau'_1$, $\tau'_2$) is transmitted by the subscriber 249, for example, the respective frequencies are separated by the filters 259, 260 and 261, so that delayed pulses are taken from the delay lines 262, 263 and 264 which are associated with the filters 259, 260 and 261, respectively. Thus, the three delay line outputs conform in time to each at a point of time when the delay for the frequency $f_3$ is $\tau'_1 + \tau'_2$, that for $f_2$ is $\tau'_2$, and that for $f_3$ is 0. Only at that point of time, a pulse appears at the terminal of the subscriber 249, so that the signal from the subscriber 249 can be detected. Normally, a subscriber uses two different codes, one for transmission and the other for reception, and therefore in the address forming network or address separating network, there are provided two terminals for each subscriber.

Figure 14:
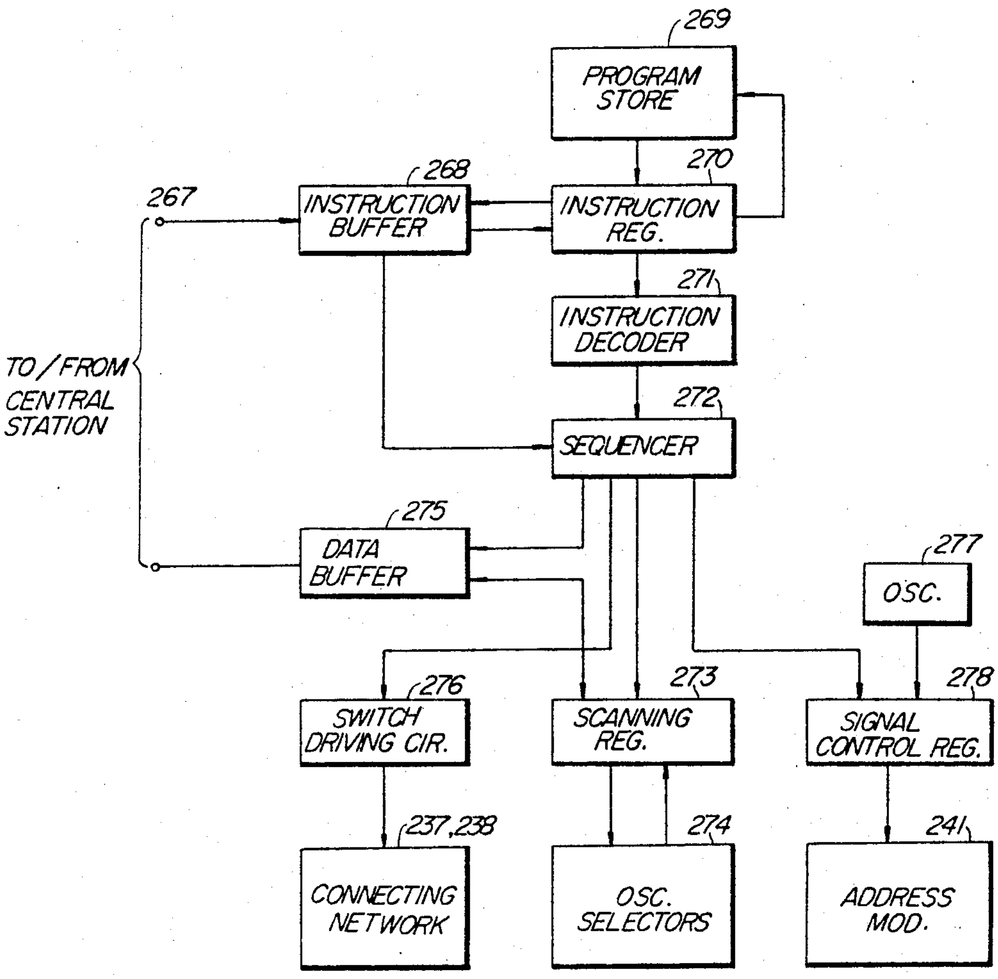
FIG. 14 is a block diagram showing the control equipment thereof.

FIG. 14 is a block diagram showing the control apparatus and peripheral circuits of the trunk station equipment. The control apparatus comprises input and output terminals 267 of the control lines leading to the central station, instruction buffer 268, program store 269, instruction register 270, instruction decoder 271, sequencer 272, scanning register 273, oscillation selectors 274, data buffer 275, switch driving switch 276, oscillator 277 and signal controlling register 278.

In case no special instruction is given by the central station, a program is read out of the program store 269 in the trunk station to be entered into the instruction register 270 to thereby scan the oscillation selectors 274 which are connected with the address separating network 265 through the instruction decoder 271, sequencer 272 and scanning register 273. The oscillation selectors 274 include two types of selectors, one for 472.5 C/S and the other for 652.5 C/S, for detecting the arrival of "off-hook" signal (472.5 C/S), "on-hook" signal (652.5 C/S) or "reswitching demand" signal (472.5 C/S + 652.5 C/S). By detecting the fact that the terminals of either one or both of the two selectors are in the "on" state, it is possible to detect a signal from a subscriber. If the signal is detected, then the content of the signal is transferred to the data buffer 275, and then it is transferred to the buffer register of the central station with the subscriber's address terminal number added thereto.

If an instruction is given by the central station, then the instruction is sent to the sequencer 272 directly from the instruction buffer 268 and executed. That is, in case the instruction is to connect or disconnect the connecting networks 237 and 238, the path between the trunk and the subscriber terminal of the address forming network 250 or address separating network 265 is connected or cut off by controlling the switch driving circuit 276. For subscriber scanning instruction, the subscriber condition is scanned by the scanning register 273 as described above, and for "busy" tone sending instruction or special emergency instruction, the signal controlling register is driven so that the signal from the oscillator 277 can be sent to any desired subscriber.

For priority communications, a priority judging receiver or priority detector is needed, the former being one of the peripheral devices for the control apparatus, which is connected with the subscriber terminal of the address separating network upon detection of the signal from the subscriber to thereby determine the degree of priority, and the latter or priority detector being a kind of oscillation selector, which is provided for each subscriber.

Figure 15:
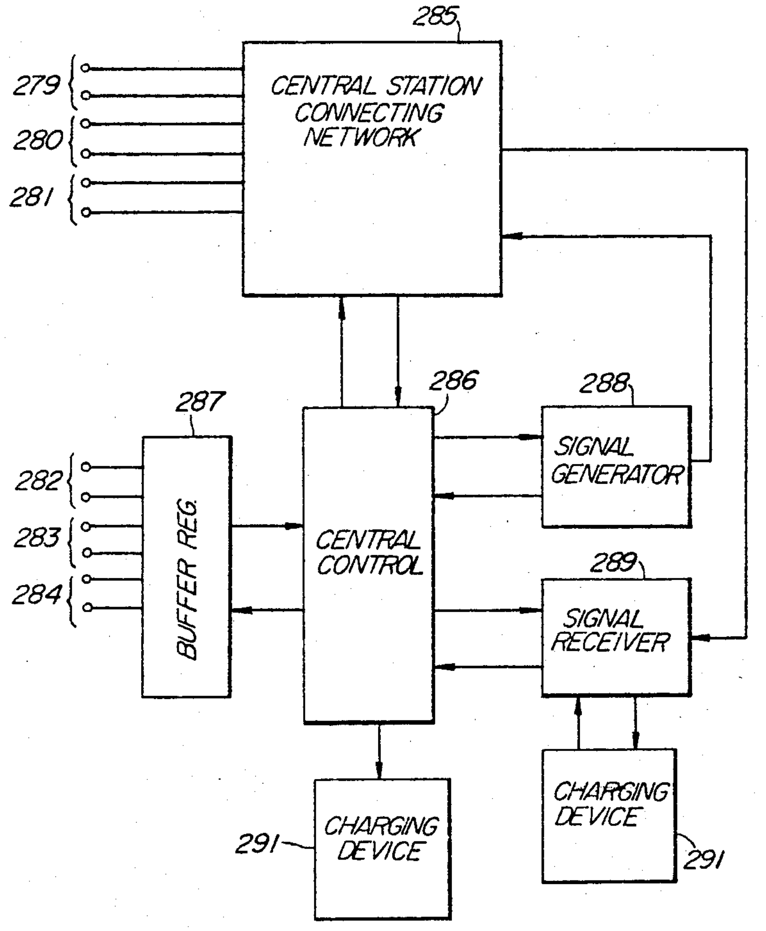
FIG. 15 is a block diagram showing the central station.

The central station includes channel trunks 279, 280 and 281 between the central station and the trunk stations, control lines 282, 283 and 284, central station connecting network 285, central control 286, buffer register 287, signal generator 288, signal receiver 290 and charging device 291, as shown in FIG. 15. Description will now be made of the case where the total number of subscribers is 1,000 and the number of the trunk station is 5.

Figure 16:
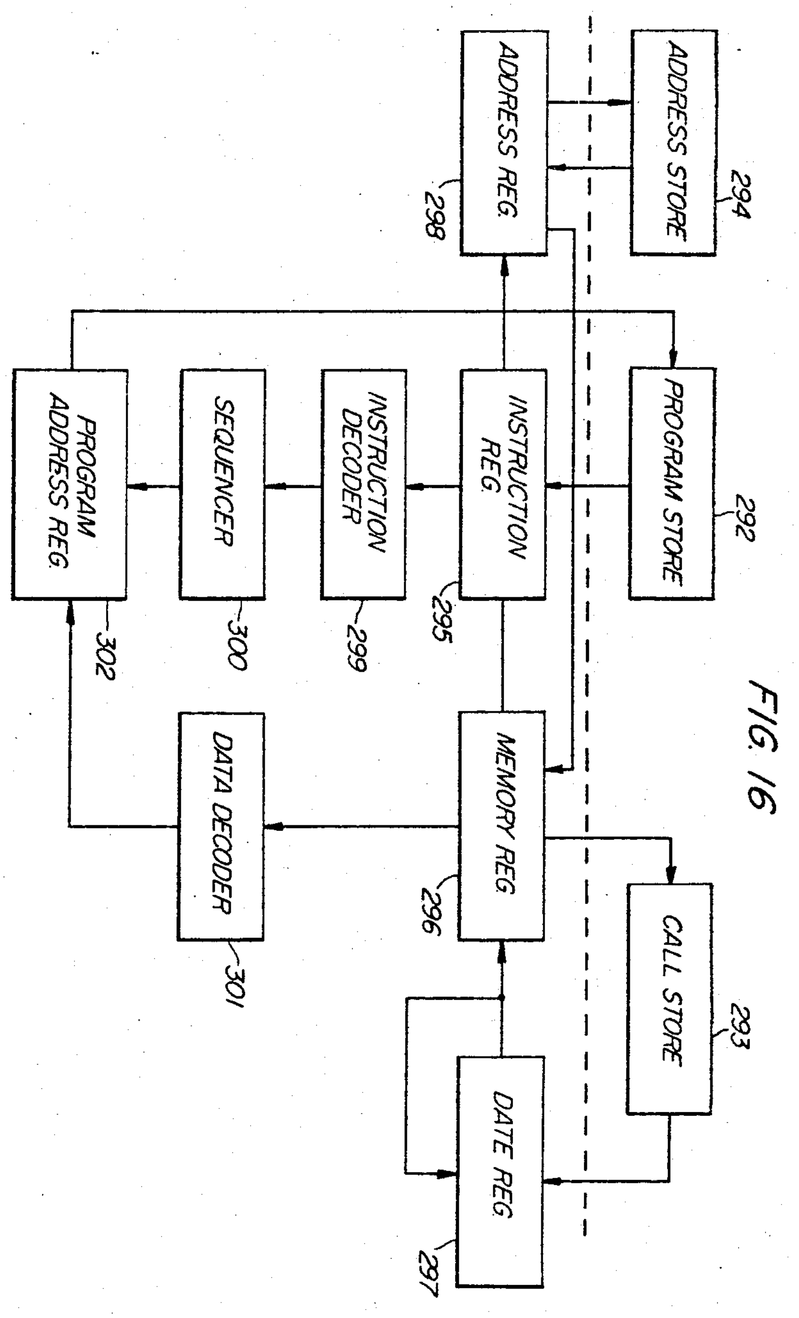
FIG. 16 is a block diagram showing the main control equipment thereof.

As shown in FIG. 16, the main control apparatus 286 is divided into a memory portion including a call store 293 adapted for storing information concerning the talking subscribers (35 bits per word, about 300 words), address store 294 adapted for storing the subscriber numbers (dial numbers) and the subscriber's address (40 bits per word, about 1,000 words), and processing portion (35 bits each) including an instruction register 295, memory register 296, data register 297, address register 298, instruction decoder 299, sequencer 300, data decoder 301 and program address register 302. Programs which are sequentially taken out of the program store 292 in accordance with the instruction by the program address register 302 are accommodated in the instruction register 295, and they are utilized to drive the external circuits with the aid of the sequencer 300 and process the information stored in the memory register 296 in accordance with the manner in which they have been translated by the instruction decoder 299. In order to increase the speed at which the content of the memory register is processed, there are provided special registers or data registers, corresponding to the contents to be processed. All of the registers are primary storage means for processing the call store 293 and can be considered as part of the latter. When the external circuits are controlled by the central control 286, the respective circuits are controlled by the sequencer 300 through the buffer, and the delivery and receipt of information is effected between the memory register 296 and each circuit through the buffer. When one instruction is executed by the sequencer 300, the next instruction is called out by the program address register 302, and the programs are successively carried out. However, the occasion may occur that the program address jumps through the medium of the data decoder 301, depending upon the content of the memory register 296.

Figure 17:
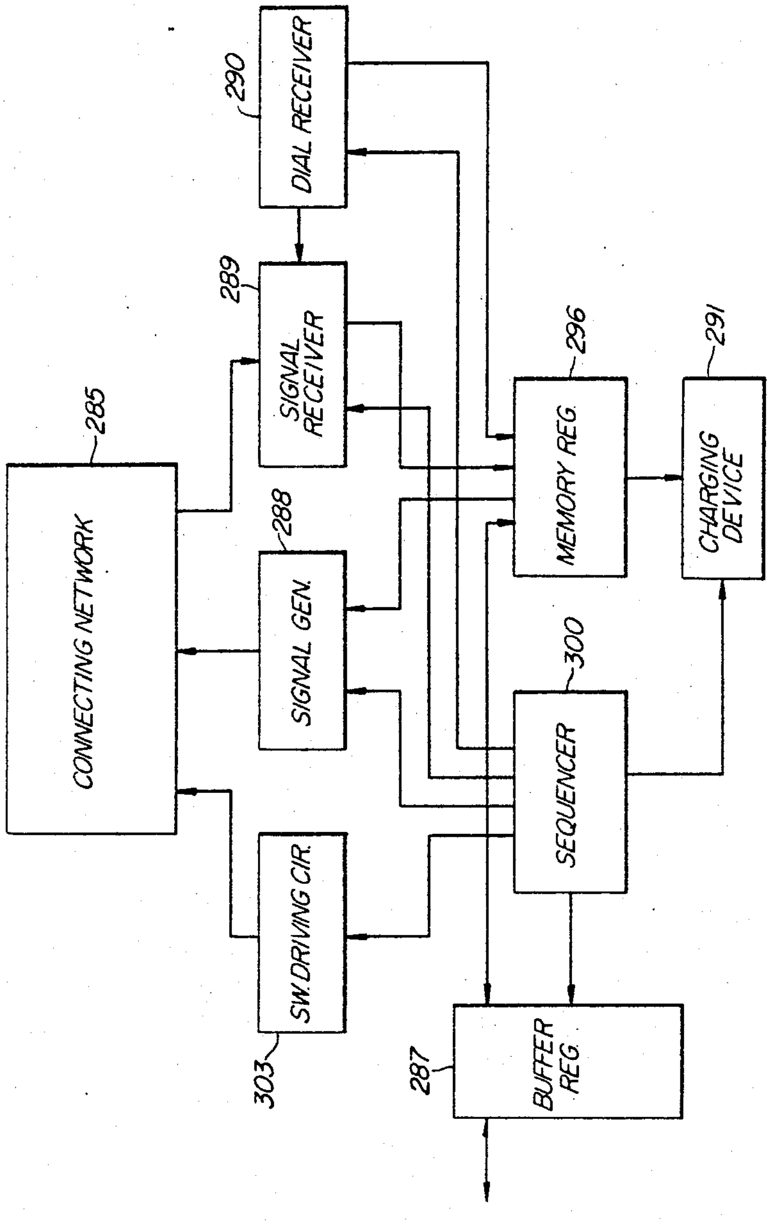
FIG. 17 shows the respective units which are under the control of the sequencer in the central station.

FIG. 17 shows the central station equipment which is controlled by the sequencer 300. The buffer register 287 is adapted to store information concerning the subscribers belonging to each trunk station when an idle register is located by each trunk station. The central control scans the buffer register 287 in accordance with its own scanning program and reads information concerning the subscribers in the memory register 296. Further, when a program or a trunk of a trunk station is directly controlled by the central control, too, the information is sent to the trunk station through the buffer register 287. The switch driving circuit 303 controls the connecting network 285 to establish connection between the trunk station or restore them. The signal generator 288 sends to the subscribers an instruction signal (802.5 C/S) and "busy condition" confirming signal (charging pulses) (intermittent at 802.5 C/S) through the trunk line terminals of the connecting network 285. The signal receiver 289 detects at the trunk line terminals 1192.5 C/S tone which is response to a signal transmitted by the signal generator 288 thereby confirming the operation of a subscriber. The dial receiver 290 detects dial information modulated at 1192.5 C/S and is adapted for a variety of number sending systems. The charging device 291 takes out of the call store information concerning the subscriber who has finished speaking, processes it and writes it into a tape.

In the foregoing, detailed description has been made of the functions and composition which constitute the novel features of the asynchronous communication system according to the present invention. The advantages obtained by using the asynchronous delta modulation system as the modulation system for the present asynchronous communication system are as follows:

1. The number of generated pulses are so small that interference with other subscribers can be minimized.
2. Because of the remarkable noise resisting property, interference by other subscribers can be substantially avoided, so that the number of simultaneous callers can be maximized.
3. No interference occurs due to the multipath effect.
4. The pattern of pulses generated in the modulator is apparently random, and crosstalk noise is nonintelligible.
5. The total number of addresses or subscribers can be made three times as large as that in the case where use is made of a two-level or three-level synchronous modulation system.
6. The modulator and demodulator circuit arrangements are relatively simplified, and yet no synchronizing means is required by the receiver and transmitter.

As described earlier, the asynchronous communications system according to the present invention is capable of handling a large number of subscribers and permits the subscribers to move. Therefore, the present system has the following advantages over the conventional communications systems in respect to control for the channels and subscribers:

1. The subscribers and trunk station are connected with each other through wireless circuits so that the movement of a subscriber device is facilitated.
2. As a rule, all the subscriber's transmission and reception terminals are provided at each trunk station.
3. As a rule, all the subscribers and trunk stations are under the control of the central station.
4. In the operation for connection, there are the following states: The stage where a subscriber's call is detected at a trunk station; the stage where the call is detected by the central station, it is subjected to discrimination concerning a variety of services, and a trunk between the central station and the trunk station is connected with the subscriber's terminal; the stage where a dial information is sent from the subscriber to the central station, and a called subscriber is signaled by a trunk station capable of the connection; and the stage where a trunk is allotted to the called subscriber who answered the signal and connection between the trunks is achieved at the central station.

5. The monitoring function includes the operation to scan the subscriber terminals at the trunk stations, and the operation to transmit a signal directly to a subscriber to thereby detect the subscriber's condition. The signal thus transmitted serves also as changing pulses.
6. The central station can control the S/N ratio of a signal received by a subscriber belonging to a particular trunk station in terms of the product of the numbers of simultaneous callers using the respective frequencies.
7. In the case of information or emergency communication, priority communication is possible.. That is, the present system is equipped with the preference function and waiting function.

The features in composition of the present system are as follows:

1. 1. transmission and reception addresses are prefixed for the subscriber stations, and therefore there is no need to change the address depending upon the called subscriber. Furthermore, press-talk is not required.
2. Each subscriber communicates with another subscriber through the nearest trunk station.
3. The trunk station can be installed at any desired place, so that any division of communication area can freely be formed.
4. Almost all of the operations are performed under the control of the central station control equipment, and calls are handled in accordance with the stored program system.
5. The control means are concentrated at the central station and trunk stations, and the transmission and reception addresses are fixed for the respective subscriber end offices, so that it is possible to avoid the intricacy of a system in which the addresses are to be varied. Thus, the subscriber station can be miniaturized, simplified and constructed at low cost.

In accordance with the present invention, each subscriber may be a simple mobile radio station, and yet it can be provided with a variety of services with a versatility which could not have been realized conventionally. Thus, the asynchronous communication system according to the present invention can be said to be a novel and effective mobile radio communication system.

In the present communication system, all the subscribers are under the control of the central station and communicate with their mate subscribers through the central station and trunk stations. However, it is also possible to disperse the controlling functions to the trunk stations to a certain extent for the maintenance and emergency use of the system, thereby coping with any possible trouble. The extent and content of such dispersion may be changed depending upon the application of the present communication system. Further, since the subscribers are mobile stations and regional information exchange is useful, communications are normally achieved under the control of the central station. in In case the central station cannot be used, however, the switching operation may be manually performed at each trunk station or a common address is previously provided to each subscriber so as to be used for information or emergency communications. Alternatively, it is possible to provide additional equipment capable of partly varying the subscriber address modulator, depending upon the field of application, purpose or occasion.

We claim:

1. An asynchronous communication system comprising a plurality of subscriber's stations, a plurality of trunk stations distributed in a multiplicity of subareas to control said subscriber's stations, which subareas are divisions of an area, and a central station to control all the trunk stations in said area; each of said subscriber's stations comprising transmission means for generating an F–T matrix address including a plurality of pulses modulating a plurality of radio frequency carriers respectively in predetermined time positions assigned to each of a plurality of subscriber's stations each time one of the pulses of pulse train constituting informations obtained by digitally modulating speech and signaling informations to be transmitted is generated, which time positions are a combination of time slots obtained by sequentially and equally dividing some constant interval of time and which radio frequency carriers are a combination chosen out of a group of radio frequencies obtained by dividing the available radio communication band width, whereby to a nearby trunk station are transmitted F–T matrix address radio pulses which are constituted by allotting a plurality of frequencies particular to said subscriber's stations to said plurality of pulses, and means which receives address radio pulses of the same type transmitted from a nearby trunk station decodes said address radio pulses to convert them into a pulse train constituting speech and signaling informations and demodulates said pulse train to finally reproduce original information; each of said trunk stations comprising means which receives the F–T matrix address radio pulses transmitted by a plurality of calling subscribers and called subscribers located within each of said subareas and decodes said radio pulses to convert them into a plurality of pulse trains constituting speech and signaling information corresponding to a plurality of subscriber's stations, means which digitally demodulates said pulse trains to reproduce a group of original informations, selects corresponding to each said group of informations a particular one of outgoing lines as instructed by said central station among trunk lines and transfers each of said group of informations to said central station through said outgoing line, means which receives a plurality of informations from calling subscribers and called subscribers in said subareas to be sent from said central station through incoming lines of said trunk lines and digitally modulates said informations to convert them into information pulse trains, and means which applies the pulse trains constituting informations respectively to subscriber terminals selected by the command of said central station and transmits F–T matrix address radio pulses corresponding to the subscriber's identification number each time information constituting pulses are generated; said central station comprising means which receives subscribers' speech and signaling informations from said trunk stations to establish talking paths by switching the connection of connecting network by means of a central control operating on a stored program principle, means which seizes the trunk lines of each trunk station registered in a memory of said central control, detects with respect to each trunk station the number of frequencies constituting respectively the addresses of subscribers and monitors the S/N ratio per each trunk station, means which blocks trunk lines other than a predetermined number of trunk lines with the aid of the S/N ratio monitor means so as to render the S/N value of each trunk station larger than a predetermined one, and means which receives reswitching demand signals generated by subscribers' stations that detect the deterioration in S/N ratio as the result of their movement from one subarea to another, and controls the alteration of trunk stations and the switch-over of talking paths by means of searching and seizing other trunk stations which can receive radio signals transmitted from said subscribers' stations.

2. An asynchronous communication system as defined in claim 1, in which each of said trunk stations includes digital modulators for converting the information signals delivered from digital modulators for converting the information signals delivered from respective incoming lines of a plurality of trunk line pairs coming from said central station into a group of information constituting pulse trains, respectively; a connecting network for connecting the output terminals of said digital modulator to transmitting terminals corresponding to a plurality of said subscriber's stations, a radio transmitter for direct communication with said subscriber's stations, including an address constituting network for providing each of said information constituting pulses appearing respectively at the output terminals of said connecting network with F–T matrix address radio pulses to be transmitted to the respective subscriber's station, which radio pulses are generated only when each of said information constituting pulse occurs at said output terminal respectively; a radio receiver for direct communication with said subscriber's stations, including an address separating network for deriving from the F–T matrix address radio pulses transmitted from said subscriber's stations, the group of information constituting pulses corresponding respectively to said subscriber's stations; a plurality of digital demodulators, each of which is connected with the respective outgoing lines of a plurality of trunk line pairs leading to said central station for converting groups of information constituting pulses delivered from said address separating network into groups of speech and signaling informations; a connecting network for connecting the outputs of said address separating network which are the receiving terminals corresponding to said subscriber's stations to the input terminals of said digital demodulators; means for receiving digital control informations including instructions for connection, disconnection and subscriber scanning, each instruction being delivered from said central station; a subscriber scanning means for scanning said receiving terminals corresponding to said subscriber's stations in accordance with said instruction for subscriber scanning to discriminate subscribers being in one of the "off-hook", "on-hook" and reswitching demand conditions; means for sending to said central station signals representative of said subscribers' conditions; a connecting network control for connecting and disconnecting said connecting networks in accordance respectively with said connecting and disconnecting instruction from said central station; and a signal control circuit for sending dial tones to subscribers in accordance with instructions from said central station.

3. An asynchronous communication system as defined in claim 1, in which said central station includes a central control consisting of a memory comprising a program store for accommodating controlling functions, a call store for storing the informations on talking subscribers and an address store for storing relationships between a subscriber number and a F–T matrix address assigned to each of said subscriber's stations and of a processing means comprising an instruction register, a memory register and a sequencer; a buffer register serving as a buffer means between the control lines of said trunk stations and said central control which buffer register comprises means connected with pairs of the incoming and outgoing control lines of said trunk stations to store subscribers' signaling informations for service demand, subscriber terminal informations and trunk station numbers sent from said trunk stations upon receipt thereof through said incoming control lines and which successively transfers said informations sent from said trunk stations to said central control in accordance with buffer register scanning instructions sent from said central control and means responsive to dialing operation in accordance with instructions from said central control for transferring the instructions for connection including subscribers' terminal numbers and trunk numbers to be connected together between said trunk stations under direct communication with calling subscriber and called subscriber through said outgoing control lines; a signal generator connected with said central control through control lines, which signal generator generates instructions for delivering signals representing called subscribers' numbers in accordance with instructions from said central control when the service demands from said central station are dial informations, creates busy tones in accordance with instructions from said central control if the trunk station and trunks for called subscribers concerned are busy, produces ringing tones in accordance with ringing instructions for the called subscribers sent from said central control if the trunk station and the trunks for the called subscribers are idle while it generates ring-back tones for associated calling subscribers, and provides signals for confirmation of talking conditions for the calling subscribers upon termination of talking in accordance with instructions from said central control, a signal receiver which receives return signals from said subscriber stations in response to the instruction signals from said central control in the form of information signals representative of the called subscribers' numbers transmitted from the calling subscribers during dialing operation and response signals returned from the called subscribers' stations and which in turn transfers these signal informations to said central control; and a connecting network connected with plural pairs of trunk lines, each pair consisting of an incoming trunk line and an outgoing trunk line, connected with said trunk stations which connecting sends or receives voice informations and signal informations to or from said trunk stations through said trunk lines, establishes connections between particular outgoing trunk lines of the trunk stations under direct communication with the calling subscribers or the called subscribers and the output terminals of said signal generators and between the incoming trunk lines of the trunk stations under direct communication with the calling subscribers or the called subscribers and the input terminals of said signal receiver in accordance with the control instructions of said central control at the stage of establishing the connections of trunks between the calling subscribers and called subscribers, and connects the incoming trunk lines of the trunk stations under direct communication with the calling subscribers with the outgoing trunk lines of the trunk stations under direct communication with the called subscribers and the outgoing trunk lines of the trunk stations under direct communication with the calling subscribers with the incoming trunk lines of the trunk stations under direct communication with the called subscribers, thereby to make possible communications between the calling subscribers and the called subscribers.

4. An asynchronous communication system as defined in claim 1, in which each of said subscribers' stations comprises an asynchronous three-level delta modulator which converts voice informations and signaling informations into a train of information constituting pulses constituted by positive, negative and zero pulses, each pulse being asynchronously spaced in time; an address modulator which generates a positive F–T matrix address and a negative F–T matrix address in response to positive and negative pulses of the information constituting pulses respectively, both addresses being particular to said subscriber stations, and which includes delay circuits for generating address constituting pulses only in predetermined time positions particular to each of said subscriber's stations among a predetermined number of sequentially and equally divided time intervals only when any positive or negative pulse is generated from said delta modulator, radio frequency oscillators particular to each of said subscriber's stations for providing exclusively in said particular time intervals the address constituting pulses with a predetermined number of frequencies particular to each of said subscriber's stations selected among a plurality of frequencies, and a digital logic network for inverting the order of frequencies allotted to the output pulses from said delay circuits depending upon whether the information constituting pulses from said asynchronous three-level delta modulator are positive or negative; radio transmitter means which radio-transmits said F–T matrix address; radio receiver means which receives and amplifies the F–T matrix address radio pulses; an address demodulator which decodes the positive and negative F–T matrix addresses particular to each of said subscriber's stations, and which includes filters particular to each of said subscriber's stations for separating a plurality of address constituting frequencies, delay circuits for providing pulses obtained by detecting the outputs of said filters with appropriate delays corresponding to the intervals of pulses constituting the addresses particular to each of said subscriber's stations with respect to the channels corresponding to the respective address constituting frequencies, a pair of digital coincidence circuits for receiving the outputs from delay circuits and decoding them as positive or negative information constituting pulses; and an asynchronous three-level delta demodulator for converting a train of information constituting pulses from said address demodulator into voice informations or control signal informations.

5. An asynchronous communication system as defined in claim 1, which controls connecting operations between calling subscriber's station and called subscriber's station by means of trunk controls provided in said trunk stations and a central control incorporated in said central station, each of said trunk controls comprising control means which detects the presence or absence of connecting instructions from the central station, control means which scans the subscriber receiving terminals by means of the subscriber scanning circuit in the case where there is no connecting instruction received from the central station and detects subscriber signal informations to transfer the informations to the central station, and control means responsive to any connecting instruction received from the central station for interrupting the scanning operation to cause the connecting network to establish the connections between the subscribers' terminals in the trunk stations and the trunk lines; and said central control comprising control means which causes the buffer register to store the subscriber signal informations from the trunk stations to identify one of the signal informations consisting of dial-tone signals, response signals, dial termination signals and reswitching demand signals by scanning the stored information, control means which allots some of the trunk lines to a first trunk station that acknowledges the receipt of "off-hook" signals from calling subscribers to detect with respect to said first trunk station the S/N value from the address informations of subscribers so that in case where the S/N value detected is larger than a predetermined reference value first trunk station transmits to the calling subscribers' commands for transmitting the informations containing the associated called subscribers' numbers by means of said signal generator, control means which causes a signal receiver and a station number receiver to receive and store the informations containing the called subscribers' numbers sent from the calling subscribers in response to said commands to detect called subscribers in accordance with the informations, control means which scans the buffer register containing the subscribers' signal informations from said first trunk station to identify the called subscribers and to detect the connection condition thereof, control means which in case where the called subscribers are not busy detects the number of the address frequencies of the subscribers who are seizing the trunk lines between said central control and the trunk stations located near the called subscribers to compare one S/N value with another among the trunk stations and to select a second trunk station for which the S/N ratio under consideration assumes the largest value, control means which causes the selected second trunk station to transmit the ringing tone signals generated by said signal generator to the called subscriber and the first trunk station to transmit the ringback tone signals to the calling subscribers, control means which completes the establishment of talking paths between the calling and called subscribers in accordance with the responses from the called subscribers detected by means of said signal receiver, and control means which breaks the established talking paths between the calling and called subscribers in response to the "hook-on" operation of either one or both of the calling and called subscribers.

6. An asynchronous communication system as defined in claim 3, wherein said central station further comprises memory means connected to said central control to store the addresses of subscribers' stations in connection, counting means connected to said memory means to count the number of subscribers' stations connected to each of said trunk stations using each of the frequency slots, decision means connected to said counting means to identify whether the respective counts or a processed value, such as a weighted sum or root-mean-square of said counts exceeds a predetermined value.

7. An asynchronous communication system as defined in claim 6, in which said central station further comprises means which scans the subscribers' terminals of the trunk stations to confirm the talking condition, means which with the aid of said scanning means transmits scanning pulses through the associated trunk stations to the subscribers' stations and then confirms the talking conditions of the subscribers by virtue of response pulses sent back from the subscribers' stations in response to the scanning pulses, and means which records talking durations and performs accounts for charging by virtue of the response pulses from the subscribers' stations.

8. An asynchronous communication system as defined in claim 4, wherein each of said subscribers' stations further comprises a field intensity detection means connected to the output of said asynchronous delta demodulation means an an oscillator connected through gating means to the input of said asynchronous delta modulation means, said field intensity detection means including threshold means for generating a reswitching demand signal indicating that the received field intensity level is below a predetermined level, and said gating means being controlled by said reswitching demand of said field intensity detection means to transmit the output of said oscillator to said asynchronous delta modulation means.

9. An asynchronous communication system as defined in claim 3, wherein said central station further comprises a plurality of field intensity detention means, each of said field intensity detection means being connected to said trunk lines from said trunk stations through said connecting network, scanning means selectively connected to each of said field intensity detection means, and comparison means connected to said scanning means for identifying a trunk station with the highest field intensity.

10. An asynchronous communication system as defined in claim 4, wherein each of said subscribers' stations further comprises a plurality of oscillators and a plurality of filters, each of said oscillators being connected to the input of said asynchronous three-level delta modulation means through gating means operated by subscribers' "off-hook", dialing, reswitching demand and "on-hook" conditions, and each of said filters being connected to the output of said asynchronous three-level delta modulation means for extracting instruction signals from trunk stations.